(12) United States Patent
Satori et al.

(10) Patent No.: US 8,199,412 B2
(45) Date of Patent: Jun. 12, 2012

(54) ZOOM LENS AND IMAGE PICKUP APPARATUS EQUIPPED WITH SAME

(75) Inventors: Tomoyuki Satori, Yokohama (JP); Hideyuki Nagaoka, Hino (JP); Kenji Ono, Fussa (JP)

(73) Assignee: Olympus Imaging Corp., Tokyo (JP)

( * ) Notice: Subject to any disclaimer, the term of this patent is extended or adjusted under 35 U.S.C. 154(b) by 73 days.

(21) Appl. No.: 12/927,984

(22) Filed: Nov. 30, 2010

(65) Prior Publication Data

US 2011/0128416 A1    Jun. 2, 2011

(30) Foreign Application Priority Data

Dec. 1, 2009 (JP) ................ 2009-273425

(51) Int. Cl.
*G02B 15/14* (2006.01)

(52) U.S. Cl. ...................... 359/680; 359/676

(58) Field of Classification Search .......... 359/676, 359/680–682, 686–688
See application file for complete search history.

(56) References Cited

U.S. PATENT DOCUMENTS

| | | | |
|---|---|---|---|
| 7,372,635 B2 | 5/2008 | Morooka et al. | |
| 7,502,171 B2 | 3/2009 | Morooka et al. | |
| 2003/0193722 A1* | 10/2003 | Mihara | 359/684 |
| 2005/0002115 A1* | 1/2005 | Mihara | 359/686 |
| 2006/0279853 A1 | 12/2006 | Morooka et al. | |
| 2008/0198474 A1 | 8/2008 | Morooka et al. | |

FOREIGN PATENT DOCUMENTS

| | | |
|---|---|---|
| JP | 2004-258240 | 9/2004 |
| JP | 2006-343622 | 12/2006 |

\* cited by examiner

*Primary Examiner* — James Greece
(74) *Attorney, Agent, or Firm* — Kenyon & Kenyon LLP

(57) ABSTRACT

A zoom lens includes, in order from the object side, an object side lens group having a negative refracting power at the wide angle end and including at least one negative lens unit, and an image side lens group having a positive refracting power at the wide angle end and including at least one positive lens unit including a cemented doublet lens component. The distance between the two lens groups is smaller at the telephoto end than at the wide angle end. The cemented doublet lens component includes, in order from the object side, a negative object side lens having a concave surface facing the image side, and positive image side lens having a meniscus shape with a concave surface facing the image side. The cemented doublet lens component is located closest to the image side in the positive lens unit. The zoom lens satisfies specific conditions.

30 Claims, 23 Drawing Sheets

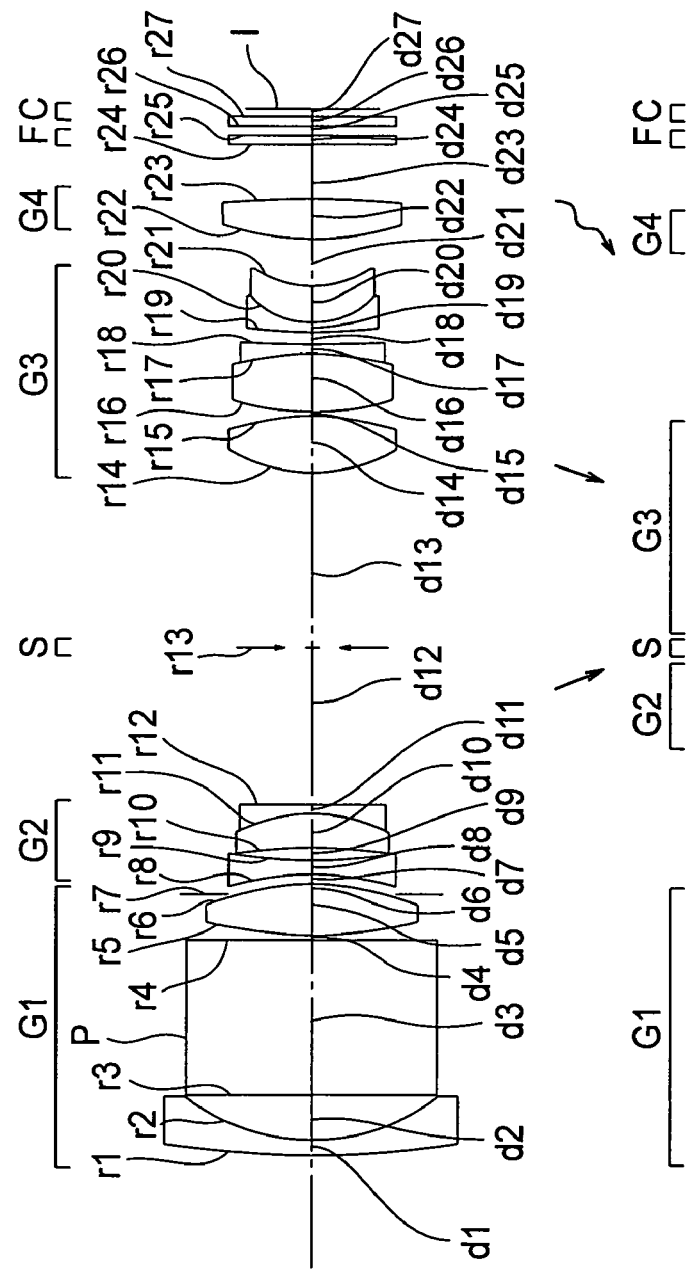
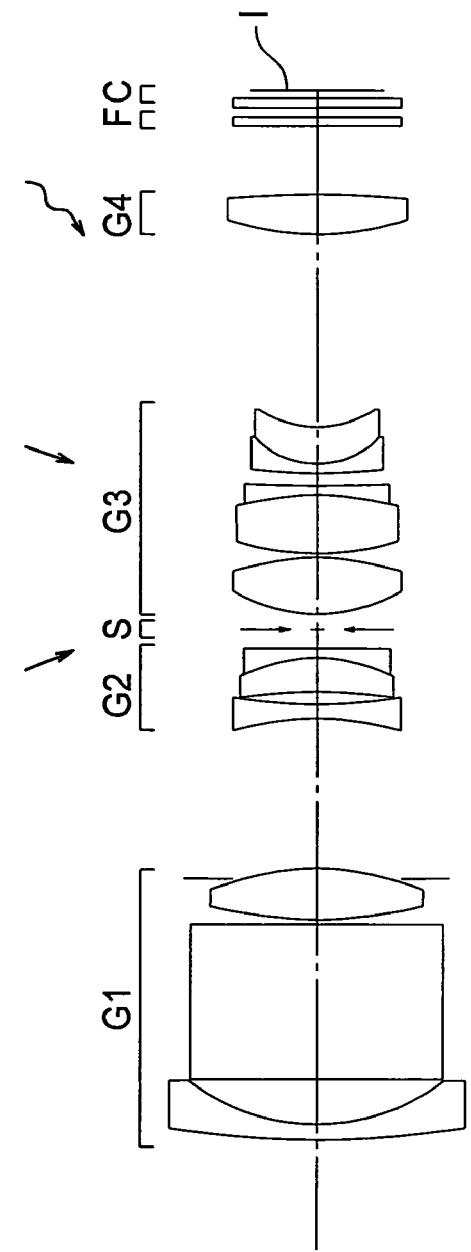
FIG. 5A
FIG. 5B 435.84 ----
486.13 —·—·—
656.27 - - - -
587.56 ———

435.84 ------
486.13 —·—·—
656.27 --------
587.56 ———

ZOOM LENS AND IMAGE PICKUP APPARATUS EQUIPPED WITH SAME

CROSS-REFERENCE TO RELATED APPLICATION

The present application is based upon and claims the benefit of priority from the prior Japanese Patent Application No. 2009-273425 filed on Dec. 1, 2009; the entire contents of which are incorporated herein by reference.

BACKGROUND OF THE INVENTION

1. Field of the Invention

The present invention relates to a zoom lens. The present invention also relates to an image pickup apparatus such as a digital camera or a video camera that is equipped with a zoom lens.

2. Description of the Related Art

In recent years, digital cameras that pick up an image of an object using an image pickup element such as a CCD or CMOS sensor have replaced film cameras and become the mainstream. Furthermore, various categories of digital cameras ranging from popular-priced compact type cameras to advanced type cameras for professionals have been developed.

Users of such popular-priced compact digital cameras (what is called compact cameras and small-sized cameras with interchangeable lenses) generally wish to enjoy easy and simple shooting in various shooting situations anywhere at any time. Therefore, a further reduction in the size of their taking lens system is demanded.

The recent mainstream technique of slimming the camera body is the use of a collapsible lens barrel. The collapsible lens barrel is adapted to extend out of the camera body when in use, and to be housed in the camera body when not in use to facilitate portability.

Another known slimming technique is bending the optical path (optical axis) of the optical system by a reflecting optical member such as a mirror or a prism. Cameras with this design can be brought into usable state without start-up time, which cameras with a collapsible lens take (to project the lens). In addition, this design is advantageous in achieving waterproofing and dustproofing. Furthermore, with this design, cameras with very small depth can be achieved.

In digital cameras with this design, the position of the lens unit closest to the object side is fixed during zooming, and a reflecting optical member is provided in this lens unit so that the optical path is bent by reflection to extend in a vertical or horizontal direction of the camera body. Thus, the depth of the camera can be made as small as possible.

For example, Japanese Patent Application Laid-Open NO. 2006-343622 discloses a zoom lens that has a reflecting optical member provided in the first lens unit closest to the object side and includes an object side lens group having a negative refracting power including the first lens unit having a positive refracting power and a second lens unit having a negative refracting power, a third lens unit having a positive refracting power, and a fourth lens unit having a positive refracting power arranged in order from the object side. With this configuration, relatively good optical performance can be achieved while making the depth small.

To reduce the size of a zoom lens, it is preferred that the lens surface closest to the image side in a positive lens unit in a rear side lens group be a concave surface, as is the case with the zoom lens disclosed in Japanese Patent Application Laid-Open NO. 2006-343622. This design facilitates refracting off-axis rays away from the optical axis by the concave surface facing the image side, thereby facilitating a reduction in the effective size of the zoom lens relative to the size of the image pickup surface.

In the case of zoom lenses having straight optical axis (i.e. interchangeable lenses and collapsible type lenses), the aforementioned design leads to a reduction in the diameter and overall length of the zoom lenses. In the case of zoom lenses in which the optical axis is bent, the aforementioned design leads to slimming of the camera body.

If the lens surface closest to the image side in a positive lens unit is a concave surface, the size of this lens unit can be made small. Therefore, in many cases, this positive lens unit is designed to have a sufficiently high positive refracting power to contribute to the magnification change, as disclosed in Japanese Patent Application Laid-Open NO. 2006-343622.

SUMMARY OF THE INVENTION

A zoom lens according to the present invention comprises a plurality of lens units and performs zooming from the wide angle end to the telephoto end by changing distances between the plurality of lens units, wherein the zoom lens comprises, in order from the object side to the image side, an object side lens group having a negative refracting power at the wide angle end and including at least one negative lens unit having a negative refracting power, and an image side lens group having a positive refracting power at the wide angle end and including at least one positive lens unit having a positive refracting power, wherein the distance between the object side lens group and the image side lens group is smaller at the telephoto end than at the wide angle end, the at least one positive lens unit having a positive refracting power in the image side lens group comprises a cemented doublet lens component, the cemented doublet lens component comprises, in order from the object side to the image side, an object side lens, which is a negative lens having a concave surface facing the image side, and an image side lens, which is a positive meniscus lens having a concave surface facing the image side, the cemented doublet lens component is located closest to the image side in the positive lens unit, and the zoom lens satisfies the following conditions:

$$0.20 < R_r / f_{IP1} < 1.40 \quad (1),$$

and $$0.5 < SF_{cem} < 20.0 \quad (3),$$

where $SF_{cem} = (R_f + R_r)/(R_f - R_r)$, $R_f$ is the radius of curvature of the object side surface of the object side lens in the cemented doublet lens component, $R_r$ is the radius of curvature of the image side surface of the image side lens in the cemented doublet lens component, and $f_{IP1}$ is the focal length of the positive lens unit including the cemented doublet lens component.

An image pickup apparatus according to another aspect of the present invention comprises:

the above-described zoom lens comprising a plurality of lens units and performing zooming from the wide angle end to the telephoto end by changing distances between the plurality of lens units; and an image pickup element comprising an image pickup surface disposed on the image side of the zoom lens and converting an image formed on the image pickup surface by the zoom lens into an electrical signal.

BRIEF DESCRIPTION OF THE DRAWINGS

FIGS. 5A and 5B are cross sectional views of a zoom lens according to a fifth embodiment of the present invention in the state in which the zoom lens is focused on an object point at infinity at the wide angle end (FIG. 5A), and at the telephoto end (FIG. 5B) respectively;

FIGS. 18A, 18B, and 10C show aberrations of the zoom lens according to the ninth embodiment in the state in which the zoom lens is focused on an object point at infinity;

DETAILED DESCRIPTION OF THE INVENTION

Figures 1A, 1B:
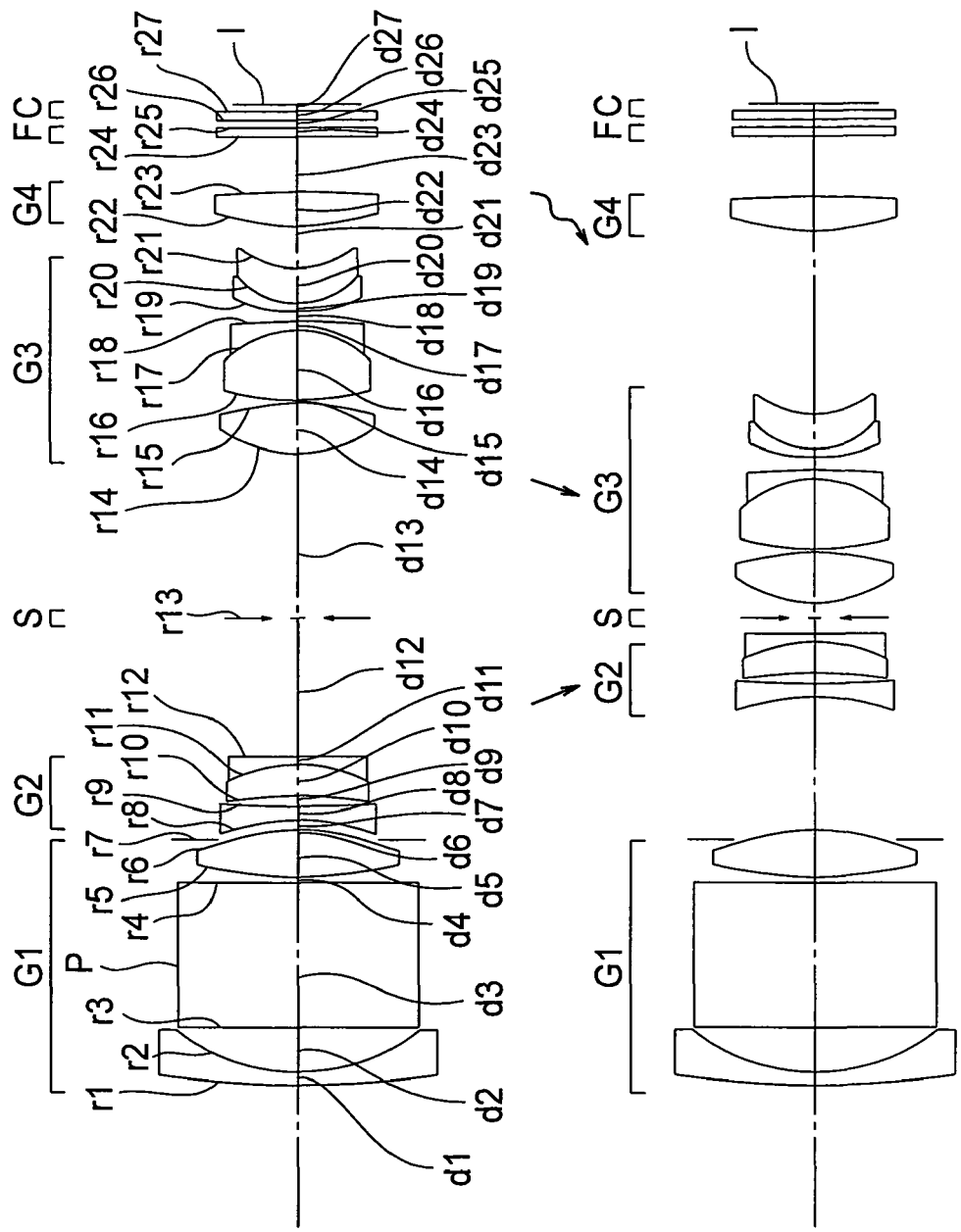
FIGS. 1A and 1B are cross sectional views of a zoom lens according to a first embodiment of the present invention in the state in which the zoom lens is focused on an object point at infinity at the wide angle end (FIG. 1A), and at the telephoto end (FIG. 1B) respectively.

The zoom lens according to the present invention includes a plurality of lens units and performs zooming from the wide angle end to the telephoto end by changing the distances between the lens units. The zoom lens includes, in order from the object side to the image side, an object side lens group having a negative refracting power at the wide angle end and including at least one negative lens unit having a negative refracting power and an image side lens group having a positive refracting power at the wide angle end and including at least one positive lens unit having a positive refracting power, wherein the distance between the object side lens group and the image side lens group is smaller at the telephoto end than at the wide angle end, at least one positive lens unit having a positive refracting power in the image side lens group includes a cemented doublet lens component including, in order from the object side to the image side, an object side lens, which is a negative lens having a concave surface facing the image side, and an image side lens, which is a positive meniscus lens having a concave surface facing the image side, the cemented doublet lens component is disposed closest to the image side in the positive lens unit, and the zoom lens satisfies the following conditions:

$$0.20 < R_f / f_{IP1} < 1.40 \quad (1),$$

and $$0.5 < SF_{cem} < 20.0 \quad (3),$$

where $SF_{cem} = (R_f + R_r)/(R_f - R_r)$, $R_f$ is the radius of curvature of the object side surface of the object side lens in the cemented doublet lens component, $R_r$ is the radius of curvature of the image side surface of the image side lens in the cemented doublet lens component, and $f_{IP1}$ is the focal length of the positive lens unit including the cemented doublet lens component.

The above configuration facilitates making the exit pupil more distant from the image plane by distribution of the refracting power among the object side lens group and the image side lens group and enables making the focal length at the wide angle end shorter to achieve an adequate angle of view advantageously.

Using the above-described cemented doublet lens as the lens component closest to the image side in the positive lens unit in the positive lens group is advantageous in correcting chromatic aberration.

In particular, arranging a negative meniscus lens and a positive meniscus lens in the mentioned order in this cemented lens component as described above and refracting off-axis rays in directions away from the optical axis are advantageous in reducing the size of the zoom lens. In addition, a material having low dispersion can be used in the aforementioned positive meniscus lens. This facilitates reducing variations in chromatic aberration of magnification during zooming. Therefore, even if the positive lens unit has an adequate refracting power to achieve a high zoom ratio, satisfactory optical performance can be achieved.

Since the cemented surface may be a surface having a small radius of curvature and concave toward the image side, the angle of incidence of effective beams entering this cemented surface can easily be made small. This is advantageous in reducing aberrations that may be caused by manufacturing errors.

Condition (1) specifies preferred values for the radius of curvature of the image side surface of the image side lens in the cemented doublet lens.

If the lower limit of condition (1) is not exceeded, the curvature of the image side surface is not excessively high. This further facilitates a reduction of variations in chromatic aberration of magnification. In addition, a reduction in other off-axis aberrations is also facilitated.

If the upper limit of condition (1) is not exceeded, the image side surface has adequate curvature. This facilitates size reduction. In addition, correction of spherical aberration and coma by the positive lens unit is also facilitated.

Condition (3) specifies preferred shapes for the cemented lens component.

It is preferred that the lower limit of condition (3) be not exceeded. Then, overcorrection of axial chromatic aberration will be prevented, and influences of decentering errors will be made small.

Not exceeding the upper limit of condition (3) is advantageous in achieving adequate correction of axial chromatic aberration.

The lens groups may each consist of either one lens unit or a plurality of lens units.

The term "lens unit" refers to a single lens or a group of lenses that is separated by variable air gaps from others.

The zoom lens according to the present invention has the above-described basic configuration. Furthermore, it is preferred that one or more of the following features be adopted additionally.

In cases where the zoom lens has a focusing function, the conditions and features described in the following are for the state in which the zoom lens is focused on the longest distance.

It is preferred that the refracting power of the object side lens group is always negative during zooming from the wide angle end to the telephoto end, and the refracting power of the image side lens group is always positive during zooming from the wide angle end to the telephoto end.

This feature is advantageous in making the position of the exit pupil distant from the image plane during zooming from the wide angle end to the telephoto end.

It is preferred that the positive lens unit including the cemented doublet lens component satisfy the following conditions during zooming from the wide angle end to the telephoto end:

$$1.3 < \beta_{IP1T}/\beta_{IP1W} < 40.0 \tag{A}$$

and $$0.30 < (\beta_{IP1T}/\beta_{IP1W})/(f_T/f_W) < 1.50 \tag{B}$$

where $\beta_{IP1T}$ is the magnification of the positive lens unit including the cemented doublet lens component at the telephoto end, $\beta_{IP1W}$ is the magnification of the positive lens unit including the cemented doublet lens component at the wide angle end, $f_T$ is the focal length of the entire zoom lens system at the telephoto end, and $f_W$ is the focal length of the entire zoom lens system at the wide angle end.

Condition (A) specifies preferred values for the magnification change ratio of the positive lens unit including the cemented doublet lens component. Condition (B) specifies preferred values for the proportion of the magnification change provided by the positive lens unit relative to the zoom ratio of the entire zoom lens system.

If the lower limits of conditions (A) and (B) are not exceeded, it is possible to suppress variations of chromatic aberration of magnification by the present invention while the positive lens unit provides an adequate magnification change. This is advantageous in achieving an adequate magnification change ratio.

If the upper limits of conditions (A) and (B) are not exceeded, the magnification change ratio of the positive lens unit can be made appropriately low. This advantageously leads to a reduction in the overall length of the zoom lens.

It is also preferred that the cemented doublet lens satisfy the following condition:

$$-60 < \nu_O - \nu_I < -15 \tag{2}$$

where $\nu_O$ is the Abbe constant of the object side lens in the cemented doublet lens component, and $\nu_I$ is the Abbe constant of the image side lens in the cemented doublet lens component.

Condition (2) specifies preferred materials for the cemented doublet lens component.

It is preferred that the lower limit of condition (2) be not exceeded to reduce the material cost.

If the upper limit of condition (2) is not exceeded, an appropriate difference in the Abbe constant is ensured. This is advantageous in correcting chromatic aberration.

It is also preferred that the cemented doublet lens component have a meniscus shape that satisfies the following condition:

$$1.05 < SF_{cem} < 20.0 \tag{3'}$$

Condition (3') further restricts the lower limit of condition (3), thereby limiting the shape of the cemented lens component to meniscus shapes.

If the lower limit of condition (3') is not exceeded, the cemented lens component has a meniscus shape. This is advantageous in making the principal point closer to the object side and in achieving an adequate magnification change ratio. This is also advantageous in reducing overcorrection of axial chromatic aberration.

It is also preferred that the image side lens in the cemented doublet lens component satisfy the following conditions:

$$1.43 < N_I < 1.82 \tag{4}$$

and $$45.0 < \nu_I < 95.0 \tag{5}$$

where $N_I$ is the refractive index of the image side lens in the cemented doublet lens component for the d-line, and $\nu_I$ is the Abbe constant of the image side lens in the double cemented lens component.

Conditions (4) and (5) specify preferred materials for the image side lens in the cemented doublet lens component.

It is preferred that the lower limit of condition (4) be not exceeded so that the image side lens has an adequate refractive index. Then, the curvature of the image side surface of the image side lens can be made appropriately low. This is advantageous in correcting aberrations.

If the upper limit of condition (4) is not exceeded so that the refractive index is appropriately low, the dispersion of the material of the image side lens can be made low. This is advantageous in correcting chromatic aberration of magnification.

If the lower limit of condition (5) is not exceeded so that the dispersion of the image side lens is made appropriately low, correction of chromatic aberration of magnification is facilitated.

If the upper limit of condition (5) is not exceeded, the cost of the material of the image side lens can be made low, and a material that is easy to process can be used.

It is also preferred that the object side lens in the cemented doublet lens satisfy the following conditions:

$$1.70 < N_O < 2.25 \quad (6),$$

and $$15.0 < v_O < 45.0 \quad (7),$$

where $N_O$ is the refractive index of the object side lens in the cemented doublet lens component for the d-line, and $v_O$ is the Abbe constant of the object side lens in the cemented doublet lens component.

Conditions (6) and (7) specify preferred materials for the object side lens in the cemented lens unit.

It is preferred that the lower limit of condition (6) be not exceeded so that the object side lens has an adequate refractive index. Then, the curvature of the object side surface of the object side lens can be made moderately low. This is advantageous in correcting aberrations.

If the upper limit of condition (6) is not exceeded, the cost of the material of the object side lens can be made low, and a material that is easy to process can be used.

If the lower limit of condition (7) is exceeded, the dispersion of the material of the object side lens will be large, and large axial chromatic aberration tends to be generated.

If the upper limit of condition (7) is exceeded, the dispersion will be small, and correction of axial chromatic aberration will tend to be insufficient. Not exceeding the upper and lower limits of condition (7) is advantageous in correcting axial chromatic aberration.

It is preferred that the positive lens unit including the cemented doublet lens component further include at least one positive lens component disposed on the object side of the cemented doublet lens component.

Here, the term "lens component" refers to a lens block whose refractive surfaces that are in contact with air in an effective optical path include only two surfaces or an object side surface and an image side surface.

Furthermore, it is preferred that the positive lens unit including the cemented doublet lens component include a plurality of positive lens components disposed on the object side of the cemented doublet lens component.

By arranging the positive lens components on the object side of the cemented lens component in the positive lens unit, the principal point can be made closer to the object side. This is advantageous in achieving an adequate magnification change ratio.

In addition, since the positive refracting power can be distributed to a plurality of lens surfaces, a reduction of aberrations is facilitated.

It is preferred that the positive lens unit including the cemented doublet lens component include, in order from the object side to the image side, a single lens component having a positive refracting power, a cemented lens component having a positive refracting power and having a positive lens and a negative lens arranged in order from the object side, and the cemented doublet lens component.

This configuration makes the principal point closer to the object side and makes the positive/negative refracting power arrangement of the lenses in the lens unit symmetric, thereby further facilitating reduction of aberrations in the positive lens unit.

It is also preferred that the cemented doublet lens component have a negative refracting power that satisfies the following condition:

$$-5.00 < f_{cem}/f_{IP1} < -0.10 \quad (8),$$

where $f_{cem}$ is the focal length of the cemented doublet lens component.

It is preferred that the lower limit of condition (8) be not exceeded so that the cemented lens component has an adequate negative refractive power and provides the function of canceling aberrations of the positive lens unit. Then, the cemented lens component can provide the effect of shifting the principal point of the positive lens unit frontward. This is advantageous in achieving an adequate magnification change ratio.

If the upper limit of condition (8) is not exceeded so that the negative refracting power of the cemented lens component is made appropriately low, overcorrection of aberrations of the positive lens unit can be prevented. This is advantageous in achieving good optical performance throughout the entire zoom ratio.

It is also preferred that the distance between the object side surface of the cemented doublet lens component and the image side surface of the lens disposed immediately on the object side of the cemented doublet lens be larger in a peripheral region than on the optical axis, and the following condition be satisfied:

$$-3.0 < SF_{air} < 20.0 \quad (c),$$

where $SF_{air} = (R_{fr} + R_{fr})/(R_{fr} - R_{fr})$, and $R_{fr}$ is the radius of curvature of the image side surface of the lens disposed immediately on the object side of the cemented doublet lens component.

If the lower limit of condition (C) is not exceeded, the cemented lens component can be designed not to have a high negative refracting power. This facilitates a reduction in higher order aberrations generated by decentering of this lens component.

If the upper limit of condition (C) is not exceeded, the lens surface immediately in front of the cemented doublet lens component can be prevented from having a strongly concave shape. This is advantageous in reducing spherical aberration and coma.

It is preferred that the object side lens group include a positive lens unit having a positive refracting power that is disposed closer to the object side than at least one negative lens unit having a negative refracting power in the object side lens group.

Arranging the positive lens unit and the negative lens unit in the object side lens group is advantageous in achieving an adequate zoom ratio and in correcting axial and off-axis aberrations throughout the entire zoom range.

Furthermore, it is preferred that the positive lens unit in the object side lens group satisfy the following condition:

$$0.20 < f_{FP}/f_T < 1.20 \quad (9),$$

where $f_{FP}$ is the focal length of the positive lens unit in the object side lens group, and $f_T$ is the focal length of the entire zoom lens system at the telephoto end.

If the lower limit of condition (9) is not exceeded so that the refracting power of the positive lens unit in the object side lens group is made appropriately low, a reduction of aberrations (in particular, distortion and astigmatism at the wide angle end and chromatic aberration and coma at the telephoto end) is facilitated.

If the upper limit of condition (9) is not exceeded so that the positive lens unit in the object side lens group has an adequate refracting power, a reduction of the overall length of the zoom lens is facilitated.

It is also preferred that at least one negative lens unit having a negative refracting power in the object side lens group satisfy the following condition:

$$-0.8 < f_{FN}/f_T < -0.10 \quad (10),$$

where $f_{FN}$ is the focal length of the negative lens unit in the object side lens group, and $f_T$ is the focal length of the entire zoom lens system at the telephoto end.

If the lower limit of condition (10) is not exceeded so that the negative lens unit has an adequate refracting power, a reduction of the overall length of the zoom lens is facilitated.

If the upper limit of condition (10) is not exceeded so that the refracting power of the negative lens unit is made appropriately low, a reduction of aberrations (in particular, distortion and astigmatism at the wide angle end and axial chromatic aberration and coma at the telephoto end) is facilitated.

It is also preferred that the distance between the positive lens unit and at least one negative lens unit having a negative refracting power in the object side lens group be larger at the telephoto end than at the wide angle end, and the negative lens unit move during zooming from the wide angle end to the telephoto end.

This is advantageous in achieving an adequate zoom ratio.

It is preferred that the positive lens unit in the object side lens group be the lens unit located closest to the object side in the zoom lens, and the position of this positive lens unit be fixed during zooming from the wide angle end to the telephoto end.

Then, the zoom lens does not take time to extend the lens upon activation of the image pickup apparatus. Therefore, start-up time that will be required in the case of cameras with a collapsible lens to bring them into usable state can be eliminated. In addition, this design is advantageous in achieving waterproofing and dustproofing.

It is also preferred that the positive lens unit in the object side lens group have a reflecting surface that bends the optical axis.

With this design, the thickness of the zoom lens in the direction of the incidence optical axis of rays entering from the object side can be made small. This is advantageous in slimming the image pickup apparatus consequently.

It is also preferred that the image side lens group include a second positive lens unit having a positive refracting power that is disposed closer to the image side than the positive lens unit including the cemented doublet lens component.

Off-axis rays exiting from the positive lens unit including the cemented doublet lens component travel away from the optical axis. Providing the second positive lens unit facilitates making the exit pupil more distant from the image plane. This is advantageous in reducing shading in the peripheral region of the image pickup area.

It is also preferred that the positive lens unit including the cemented doublet lens component in the image side lens group satisfy the following condition:

$$0.15 < f_{IP1}/f_T < 1.00 \quad (11),$$

where $f_T$ is the focal length of the entire zoom lens system at the telephoto end.

It is preferred that the lower limit of condition (11) be not exceeded so that the refracting power of the positive lens unit is appropriately low. This is advantageous in reducing aberrations (in particular, spherical aberration and coma at all the zoom positions and axial chromatic aberration at the telephoto end).

It is preferred that the upper limit of condition (11) be not exceeded so that the positive lens unit has an adequate refracting power. This is advantageous in reducing the overall length of the zoom lens.

It is also preferred that the second positive lens unit in the image side lens group satisfy the following condition:

$$0.40 < f_{IP2}/f_T < 2.50 \quad (12),$$

where $f_{IP2}$ is the focal length of the second positive lens unit, and $f_T$ is the focal length of the entire zoom lens system at the telephoto end.

If the lower limit of condition (12) is not exceeded, the refracting power of the second positive lens unit is made appropriately low. This facilitates suppressing over correction of astigmatism and distortion.

If the upper limit of condition (12) is not exceeded, the second positive lens unit has an adequate refracting power. This is advantageous in correcting astigmatism and distortion throughout the entire zoom range.

It is also preferred that the distance between the positive lens unit including the cemented doublet lens component and the second positive lens unit in the image side lens group be larger at the telephoto end than at the wide angle end, and the positive lens unit including the cemented doublet lens component move during zooming from the wide angle end to the telephoto end.

This design is advantageous in achieving adequate magnification change by the positive lens unit including the cemented doublet lens component. Furthermore, if the second positive lens unit is fixed, or if the amount of movement of the second positive lens unit is small, an advantage in achieving telecentricity is provided.

It is preferred that the second positive lens unit be moved during focusing.

Since the second positive lens unit can easily be made small, using this lens unit for focusing facilitates the control.

It is preferred that the zoom lens satisfy the following condition:

$$1.20 < L_T/f_T < 4.00 \quad (13),$$

where $L_T$ is the overall length of the zoom lens at the telephoto end, and $f_T$ is the focal length of the entire zoom lens system at the telephoto end.

If the lower limit of condition (13) is not exceeded, the refracting power of each lens unit in the zoom lens can easily be made small. This is advantageous in correcting aberrations.

It is preferred that the upper limit of condition (13) be not exceeded so that the overall length of the zoom lens is made small, thereby achieving compactness of the zoom lens.

It is preferred that an aperture stop be provided between the object side lens group and the image side lens group.

By this design, an entrance pupil and an exit pupil can be appropriately set. This is advantageous in achieving a reduction in the outer diameter of the lens located closest to the object side and telecentricity at the same time.

Furthermore, it is preferred that the position of the aperture stop be fixed during zooming from the wide angle end to the telephoto end.

With this design, simplification of the mechanical structure can be achieved. In addition, this design is advantageous in achieving a size reduction, because a space for allowing movement of the aperture stop need not be provided.

It is also preferred that the object side lens group include, in order from the object side to the telephoto side, a positive lens unit having a positive refracting power and the negative lens unit, the image side lens group include two positive lens units each having a positive refracting power, and one of the positive lens units in the image side lens group be the positive lens unit including the cemented doublet lens component. This design is advantageous in achieving an adequate zoom ratio with a small number of lens units.

It is also preferred that the object side lens group include, in order from the object side to the image side, a positive lens unit having a positive refracting power and the negative lens unit, the image side lens group include three positive lens units each having a positive refracting power, and one of the positive lens units in the image side lens group be the positive lens unit including the cemented doublet lens component. This design facilitates reducing the effective diameter of the image side lens group.

It is preferred that the object side lens group consist of the negative lens unit, the image side lens group include two positive lens units each having a positive refracting power, and one of the positive lens units in the image side lens group be the positive lens unit including the cemented doublet lens component. This design is advantageous in achieving compactness of the zoom lens in the collapsed state and in achieving an adequate angle of view.

The image pickup apparatus according to the present invention comprises a zoom lens including a plurality of lens units and performs zooming from the wide angle end to the telephoto end by changing the distances between the lens units, and an image pickup element that has an image pickup surface disposed on the image side of the zoom lens and converts an image formed on the image pickup surface by the zoom lens into an electrical signal, wherein the zoom lens is one of the zoom lenses described in the foregoing.

It is more preferred that the image pickup apparatus have an image transformation section that changes, by image processing, an electrical signal representing an image containing distortion attributed to the zoom lens into an image signal that is corrected in terms of distortion.

There tends to be a trade-off between distortion and astigmatism. If the above-described image transformation section is provided, the zoom lens is allowed to have distortion. Therefore, having such an image transformation section is advantageous in reducing astigmatism of the zoom lens and in reducing the size.

It is also preferred that the image pickup apparatus have a processing circuit that changes a signal representing an image formed on the image pickup surface and containing chromatic aberration of magnification attributed to the zoom lens into a signal representing an image that is corrected in terms of chromatic aberration of magnification.

If this is the case, the zoom lens is allowed to generate chromatic aberration of magnification. This is advantageous in reducing the cost and in achieving good performance.

It is more preferred one or more of the above-described conditions and features be satisfied.

Furthermore, it is more preferred that the above described conditions be modified as follows.

In condition (1), it is more preferred that the lower limit value be 0.25, still more preferably 0.30, and the upper limit value be 0.90, still more preferably 0.60.

In condition (3), it is more preferred that the lower limit value be 0.8, still more preferably 0.9, still more preferably 1.0, and the upper limit value be 15.0, still more preferably 4.0.

In condition (A), it is more preferred that the lower limit value be 1.5, still more preferably 1.7, still more preferably 1.9, and the upper limit value be 20.0, still more preferably 5.0, still more preferably 3.0.

In condition (B), it is more preferred that the lower limit value be 0.35, still more preferably 0.40, and the upper limit value be 1.20, still more preferably 1.00.

In condition (2), it is more preferred that the lower limit value be −50, still more preferably −40, and the upper limit value be −25, still more preferably −30.

In condition (3'), it is more preferred that the lower limit value be 1.1, still more preferably 1.2, still more preferably 1.3, and the upper limit value be 15.0, still more preferably 4.0.

In condition (4), it is more preferred that the lower limit value be 1.48, and the upper limit value be 1.75, still more preferably 1.63.

In condition (5), it is more preferred that the lower limit value be 50, still more preferably 55, and the upper limit value be 80, still more preferably 75.

In condition (6), it is more preferred that the lower limit value be 1.72, still more preferably 1.80, still more preferably 1.90, and the upper limit value be 2.20, still more preferably 2.10.

In condition 7), it is more preferred that the lower limit value be 20.0, still more preferably 25.0, and the upper limit value be 40.0, still more preferably 35.0.

In condition (8), it is more preferred that the lower limit value be −3.50, still more preferably −2.00, and the upper limit value be −0.15.

In condition (C), it is more preferred that the lower limit value be −2.0, still more preferably −1.0, still more preferably 0.0, and the upper limit value be 10.0, still more preferably 6.0, more preferably 3.0.

In condition (9), it is more preferred that the lower limit value be 0.30, still more preferably 0.40, and the upper limit value be 0.90, still more preferably 0.60.

In condition (10), it is more preferred that the lower limit value be −0.60, still more preferably −0.40 and the upper limit value be −0.20, still more preferably −0.25.

In condition (11), it is more preferred that the lower limit value be 0.25, still more preferably 0.35, and the upper limit value be 0.80, still more preferably 0.60.

In condition (12), it is more preferred that the lower limit value be 0.60, still more preferably 0.80, and the upper limit value be 2.00, still more preferably 1.50.

In condition (13), it is more preferred that the lower limit value be 1.55, still more preferably 1.90, and the upper limit value be 3.00, still more preferably 2.50.

In the following, embodiments of the zoom lens and the image pickup apparatus according to the present invention will be described in detail with reference to the drawings. It should be understood that the present invention is not limited by the embodiments.

In the following, first to ninth embodiments of the zoom lens according to the present invention will be described. FIGS. 1A-1B through 9A-9B are cross sectional views of the zoom lenses according to the first to ninth embodiments in the state in which the zoom lenses are focused at an object point at infinity respectively at the wide angle end (FIGS. 1A, 2A, 3A, 4A, 5A, 6A, 7A, 8A, and 9A) and at the telephoto end (FIGS. 1B, 2B, 3B, 4B, 5B, 6B, 7B, 8B, and 9B). In FIGS. 1A-1B through 9A-9B, a first lens unit is denoted by G1, a second lens unit is denoted by G2, an aperture stop is denoted by S, a third lens unit is denoted by G3, a fourth lens unit is denoted by G4, a fifth lens unit is denoted by G5, a plane parallel plate constituting a low pass filter on which wavelength range restriction coating that blocks or reduces infrared light is applied is denoted by F, a plane parallel plate constituting a cover glass for an image pickup element is denoted by C, and the image plane is denoted by I. The cover glass C may have a multi-layer film for wavelength range restriction applied on its surface. The cover glass C may be designed to have the function of a low pass filter.

All the numerical data presented below are for the state in which the zoom lens is focused on an object at infinity. In the numerical data, dimensions are in mm (millimeters) and angles are in degrees. In all the embodiments, focusing is performed by moving the lens unit closest to the image side. Zoom data will be presented for the wide angle end (WE), a first intermediate focal length state (ST1), a second intermediate focal length state (ST2), a third intermediate focal length state (ST3), and the telephoto end (TE).

The zoom lenses according to the first to sixth, eighth, and ninth embodiments are image forming optical systems that are small in depth and short in overall length, have a large half angle of view of approximately 40 degrees at the wide angle end while having a high zoom ratio of approximately 5, and have high optical specifications and performance with well-corrected chromatic aberration.

The zoom lens according to the seventh embodiment is an image forming optical system that have good optical performance while consisting of a small number of lenses and can be made easily small when collapsed.

An electronic image pickup apparatus that is small in size and has good optical performance can be achieved by using a zoom lens according to one of the embodiments as the image forming optical system.

The third and fourth lens surfaces in the numerical data that will be presented below correspond to the entrance and exit surfaces of a reflecting prism. The seventh surface is a flare stop, which is planar. Surface I is the image pickup surface.

In the first to eighth embodiments except the last or ninth embodiment, the air distances between the first lens unit G1 including the prism, the aperture stop S, the low pass filter F, the cover glass C of the image pickup element, and the image pickup surface I of the image pickup element are constant.

As shown in FIGS. 1A and 1B, the zoom lens according to the first embodiment includes, in order from the object side, a first lens unit G1 having a positive refracting power, a second lens unit G2 having a negative refracting power, an aperture stop S, a third lens unit G3 having a positive refracting power, and a fourth lens unit G4 having a positive refracting power.

During zooming from the wide angle end to the telephoto end, the first lens unit G1 is fixed, the second lens unit G2 moves toward the image side, the third lens unit G3 moves toward the object side, and the fourth lens unit G4 moves first toward the image side, thereafter toward the object side, still thereafter back toward the image side, and finally toward the object side.

The first lens unit G1 is composed of a negative meniscus lens having a convex surface directed toward the object side, a prism P for bending the optical path, and a biconvex positive lens. The second lens unit G2 is composed of a biconcave negative lens, and a cemented lens made up of a positive meniscus lens having a convex surface directed toward the image side and a biconcave negative lens. The third lens unit G3 is composed of a biconvex positive lens, a cemented lens made up of biconvex positive lens and a negative meniscus lens having a convex surface directed toward the image side, and a cemented lens made up of a negative meniscus lens having a convex surface directed toward the object side and a positive meniscus lens having a convex surface directed toward the object side. The fourth lens unit G4 is composed of a biconvex positive lens. The lens elements in each lens unit G1, G2, G3, G4 are arranged in the mentioned order from the object side.

There are eight aspheric surfaces, which include both surfaces of the biconvex positive lens in the first lens unit G1, both surfaces of the biconcave negative lens in the second lens unit G2, both surfaces of the object side biconvex positive lens in the third lens unit G3, and both surfaces of the biconvex positive lens in the fourth lens unit G4.

Figures 2A, 2B:
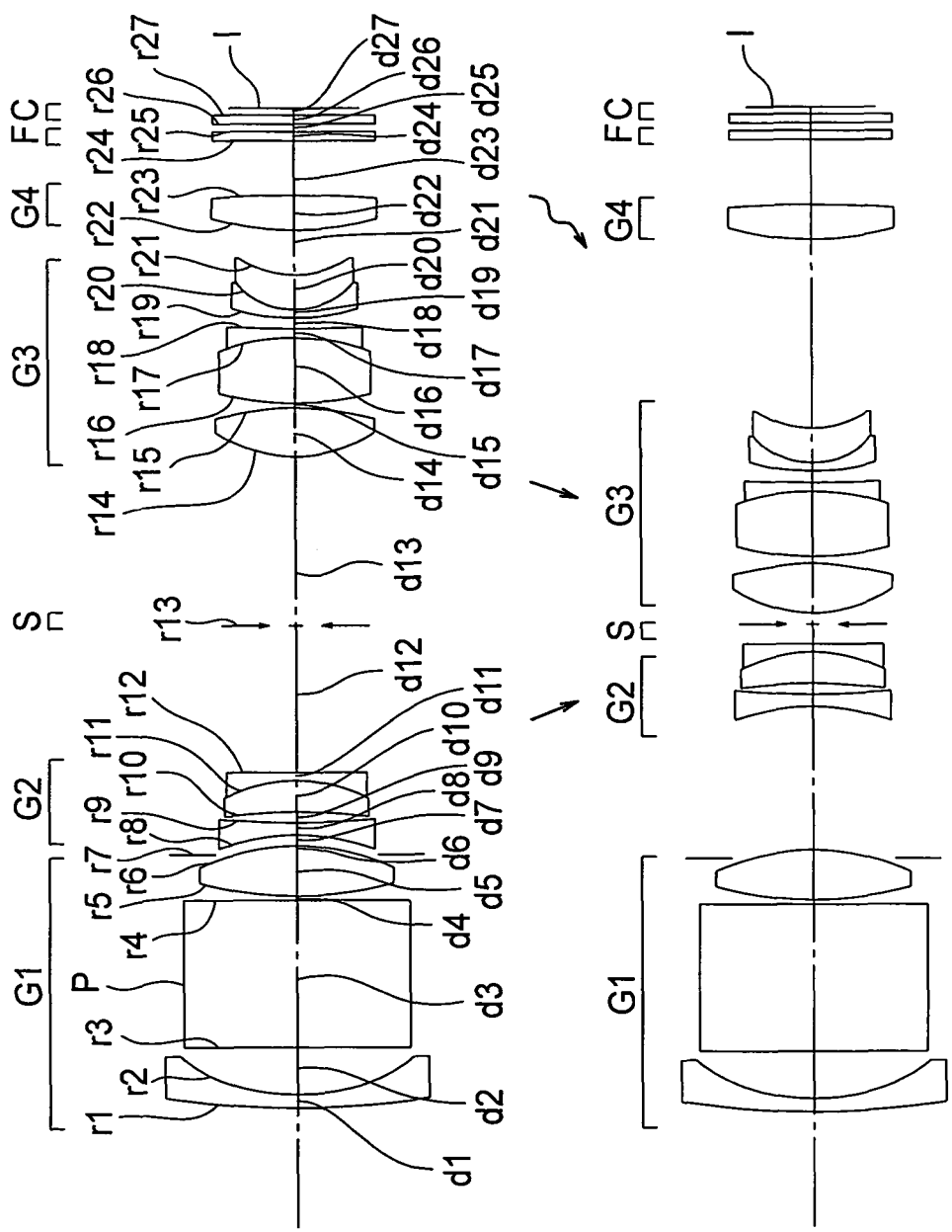
FIGS. 2A and 2B are cross sectional views of a zoom lens according to a second embodiment of the present invention in the state in which the zoom lens is focused on an object point at infinity at the wide angle end (FIG. 2A), and at the telephoto end (FIG. 2B) respectively.

As shown in FIGS. 2A and 2B, the zoom lens according to the second embodiment includes, in order from the object side, a first lens unit G1 having a positive refracting power, a second lens unit G2 having a negative refracting power, an aperture stop S, a third lens unit G3 having a positive refracting power, and a fourth lens unit G4 having a positive refracting power.

During zooming from the wide angle end to the telephoto end, the first lens unit G1 is fixed, the second lens unit G2 moves toward the image side, the third lens unit G3 moves toward the object side, and the fourth lens unit G4 moves first toward the image side, thereafter toward the object side, still thereafter back toward the image side, and finally toward the object side.

The first lens unit G1 is composed of a negative meniscus lens having a convex surface directed toward the object side, a prism P for bending the optical path, and a biconvex positive lens. The second lens unit G2 is composed of a biconcave negative lens, and a cemented lens made up of a positive meniscus lens having a convex surface directed toward the image side and a biconcave negative lens. The third lens unit G3 is composed of a biconvex positive lens, a cemented lens made up of biconvex positive lens and a biconcave negative lens, and a cemented lens made up of a negative meniscus lens having a convex surface directed toward the object side and a positive meniscus lens having a convex surface directed toward the object side. The fourth lens unit G4 is composed of a biconvex positive lens. The lens elements in each lens unit G1, G2, G3, G4 are arranged in the mentioned order from the object side.

There are eight aspheric surfaces, which include both surfaces of the biconvex positive lens in the first lens unit G1, both surfaces of the biconcave negative lens in the second lens unit G2, both surfaces of the object side biconvex positive lens in the third lens unit G3, and both surfaces of the biconvex positive lens in the fourth lens unit G4.

Figures 3A, 3B:
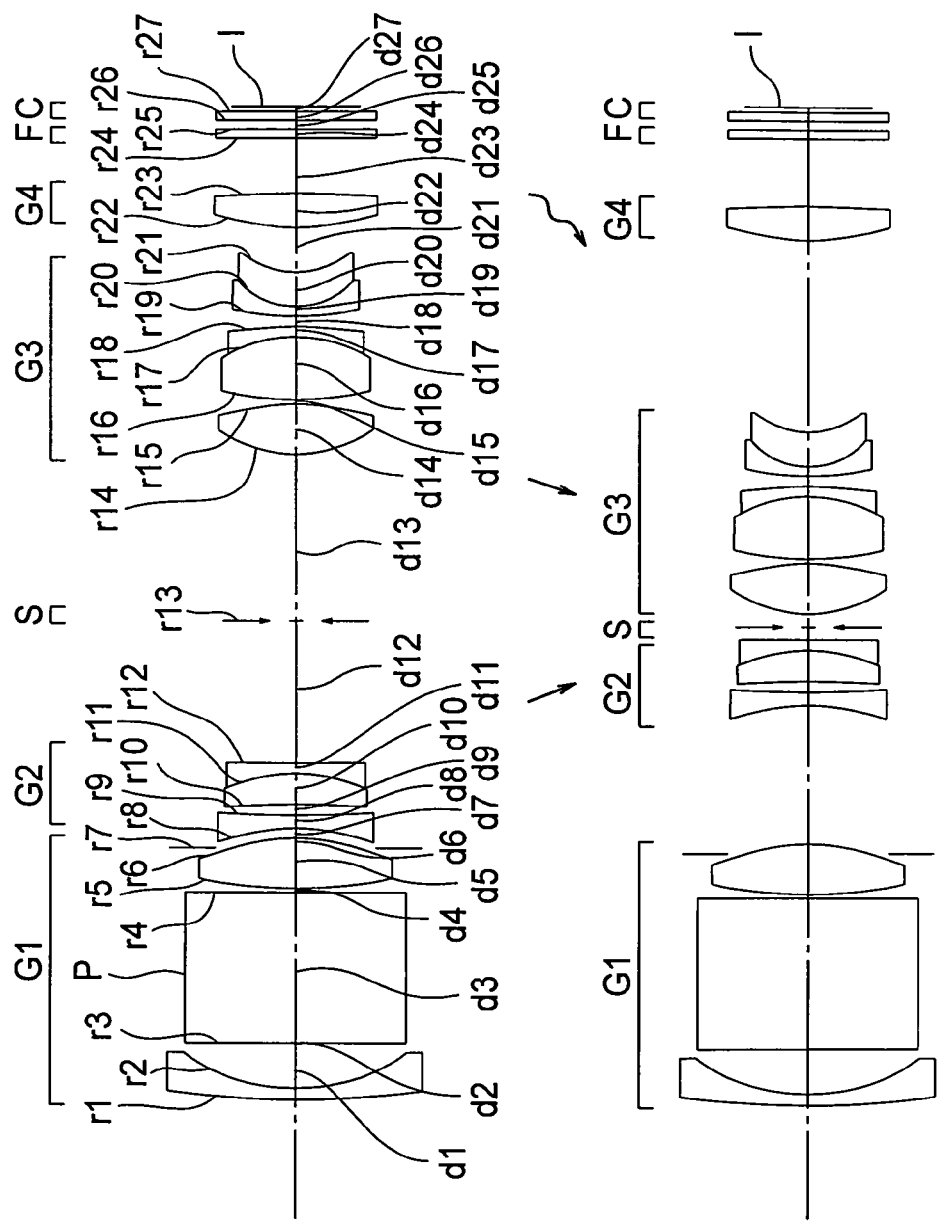
FIGS. 3A and 3B are cross sectional views of a zoom lens according to a third embodiment of the present invention in the state in which the zoom lens is focused on an object point at infinity at the wide angle end (FIG. 3A), and at the telephoto end (FIG. 3B) respectively.

As shown in FIGS. 3A and 3B, the zoom lens according to the third embodiment includes, in order from the object side, a first lens unit G1 having a positive refracting power, a second lens unit G2 having a negative refracting power, an aperture stop S, a third lens unit G3 having a positive refracting power, and a fourth lens unit G4 having a positive refracting power.

During zooming from the wide angle end to the telephoto end, the first lens unit G1 is fixed, the second lens unit G2 moves toward the image side, the third lens unit G3 moves toward the object side, and the fourth lens unit G4 moves first toward the image side, thereafter toward the object side, still thereafter back toward the image side, and finally toward the object side.

The first lens unit G1 is composed of a negative meniscus lens having a convex surface directed toward the object side, a prism P for bending the optical path, and a biconvex positive lens. The second lens unit G2 is composed of a biconcave negative lens, and a cemented lens made up of a positive meniscus lens having a convex surface directed toward the image side and a biconcave negative lens. The third lens unit G3 is composed of a biconvex positive lens, a cemented lens made up of biconvex positive lens and a negative meniscus lens having a convex surface directed toward the image side, and a cemented lens made up of a negative meniscus lens having a convex surface directed toward the object side and a positive meniscus lens having a convex surface directed toward the object side. The fourth lens unit G4 is composed of a biconvex positive lens. The lens elements in each lens unit G1, G2, G3, G4 are arranged in the mentioned order from the object side.

There are eight aspheric surfaces, which include both surfaces of the biconvex positive lens in the first lens unit G1, both surfaces of the biconcave negative lens in the second lens unit G2, both surfaces of the object side biconvex positive lens in the third lens unit G3, and both surfaces of the biconvex positive lens in the fourth lens unit G4.

Figures 4A, 4B:
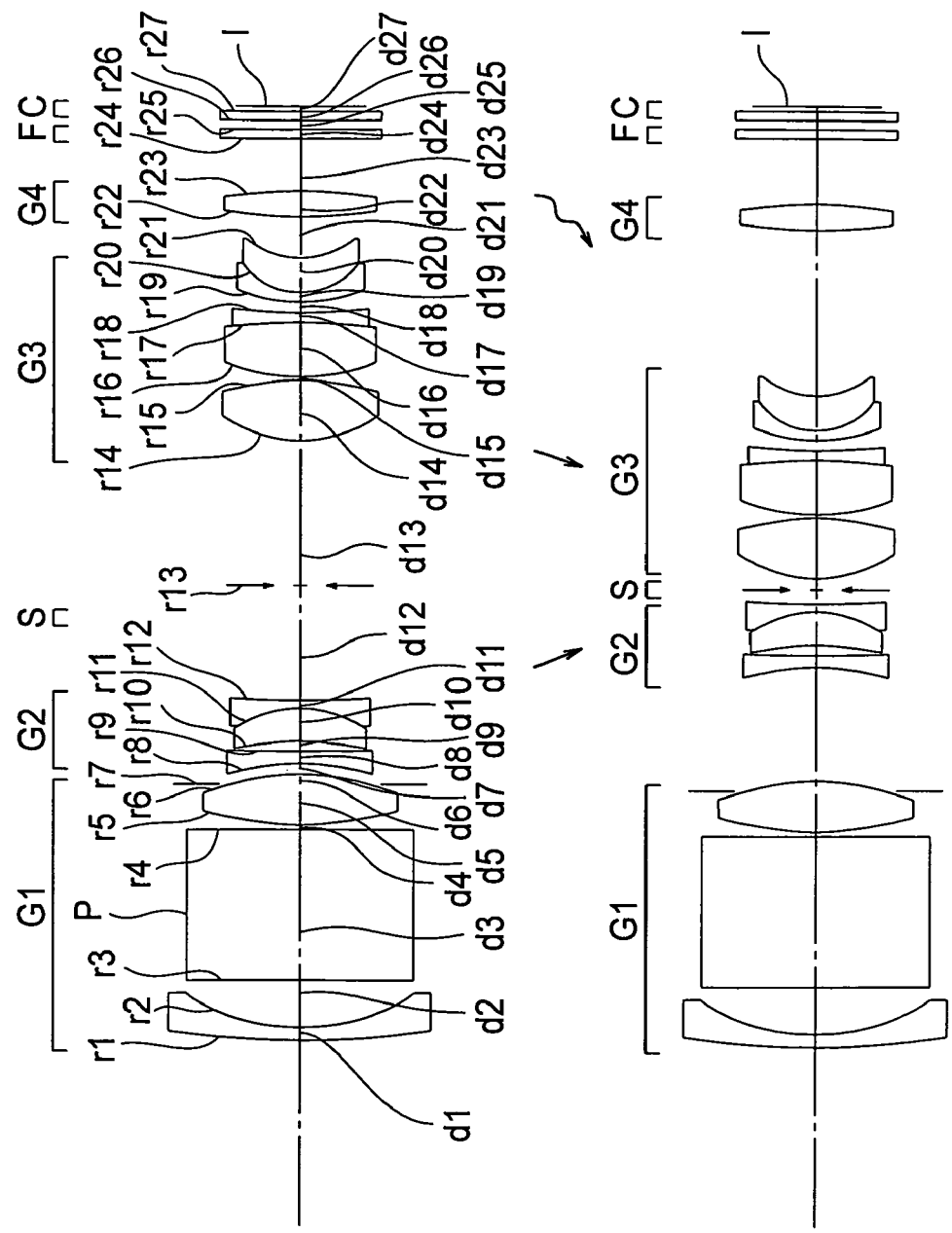
FIGS. 4A and 4B are cross sectional views of a zoom lens according to a fourth embodiment of the present invention in the state in which the zoom lens is focused on an object point at infinity at the wide angle end (FIG. 4A), and at the telephoto end (FIG. 4B) respectively.

As shown in FIGS. 4A and 4B, the zoom lens according to the fourth embodiment includes, in order from the object side, a first lens unit G1 having a positive refracting power, a second lens unit G2 having a negative refracting power, an aperture stop S, a third lens unit G3 having a positive refracting power, and a fourth lens unit G4 having a positive refracting power.

During zooming from the wide angle end to the telephoto end, the first lens unit G1 is fixed, the second lens unit G2 moves toward the image side, the third lens unit G3 moves toward the object side, and the fourth lens unit G4 moves first toward the image side, thereafter toward the object side, still thereafter back toward the image side, and finally toward the object side.

The first lens unit G1 is composed of a negative meniscus lens having a convex surface directed toward the object side, a prism P for bending the optical path, and a biconvex positive lens. The second lens unit G2 is composed of a biconcave negative lens, and a cemented lens made up of a positive meniscus lens having a convex surface directed toward the image side and a biconcave negative lens. The third lens unit G3 is composed of a biconvex positive lens, a cemented lens made up of biconvex positive lens and a biconcave negative lens, and a cemented lens made up of a negative meniscus lens having a convex surface directed toward the object side and a positive meniscus lens having a convex surface directed toward the object side. The fourth lens unit G4 is composed of a biconvex positive lens. The lens elements in each lens unit G1, G2, G3, G4 are arranged in the mentioned order from the object side.

There are eight aspheric surfaces, which include both surfaces of the biconvex positive lens in the first lens unit G1, both surfaces of the biconcave negative lens in the second lens unit G2, both surfaces of the object side biconvex positive lens in the third lens unit G3, and both surfaces of the biconvex positive lens in the fourth lens unit G4.

As shown in FIGS. 5A and 5B, the zoom lens according to the fifth embodiment includes, in order from the object side, a first lens unit G1 having a positive refracting power, a second lens unit G2 having a negative refracting power, an aperture stop S, a third lens unit G3 having a positive refracting power, and a fourth lens unit G4 having a positive refracting power.

During zooming from the wide angle end to the telephoto end, the first lens unit G1 is fixed, the second lens unit G2 moves toward the image side, the third lens unit G3 moves toward the object side, and the fourth lens unit G4 moves first toward the image side, thereafter toward the object side, still thereafter back toward the image side, and finally toward the object side.

The first lens unit G1 is composed of a negative meniscus lens having a convex surface directed toward the object side, a prism P for bending the optical path, and a biconvex positive lens. The second lens unit G2 is composed of a biconcave negative lens, and a cemented lens made up of a positive meniscus lens having a convex surface directed toward the image side and a biconcave negative lens. The third lens unit G3 is composed of a biconvex positive lens, a cemented lens made up of biconvex positive lens and a biconcave negative lens, and a cemented lens made up of a negative meniscus lens having a convex surface directed toward the object side and a positive meniscus lens having a convex surface directed toward the object side. The fourth lens unit G4 is composed of a biconvex positive lens. The lens elements in each lens unit G1, G2, G3, G4 are arranged in the mentioned order from the object side.

There are eight aspheric surfaces, which include both surfaces of the biconvex positive lens in the first lens unit G1, both surfaces of the biconcave negative lens in the second lens unit G2, both surfaces of the object side biconvex positive lens in the third lens unit G3, and both surfaces of the biconvex positive lens in the fourth lens unit G4.

Figures 6A, 6B:
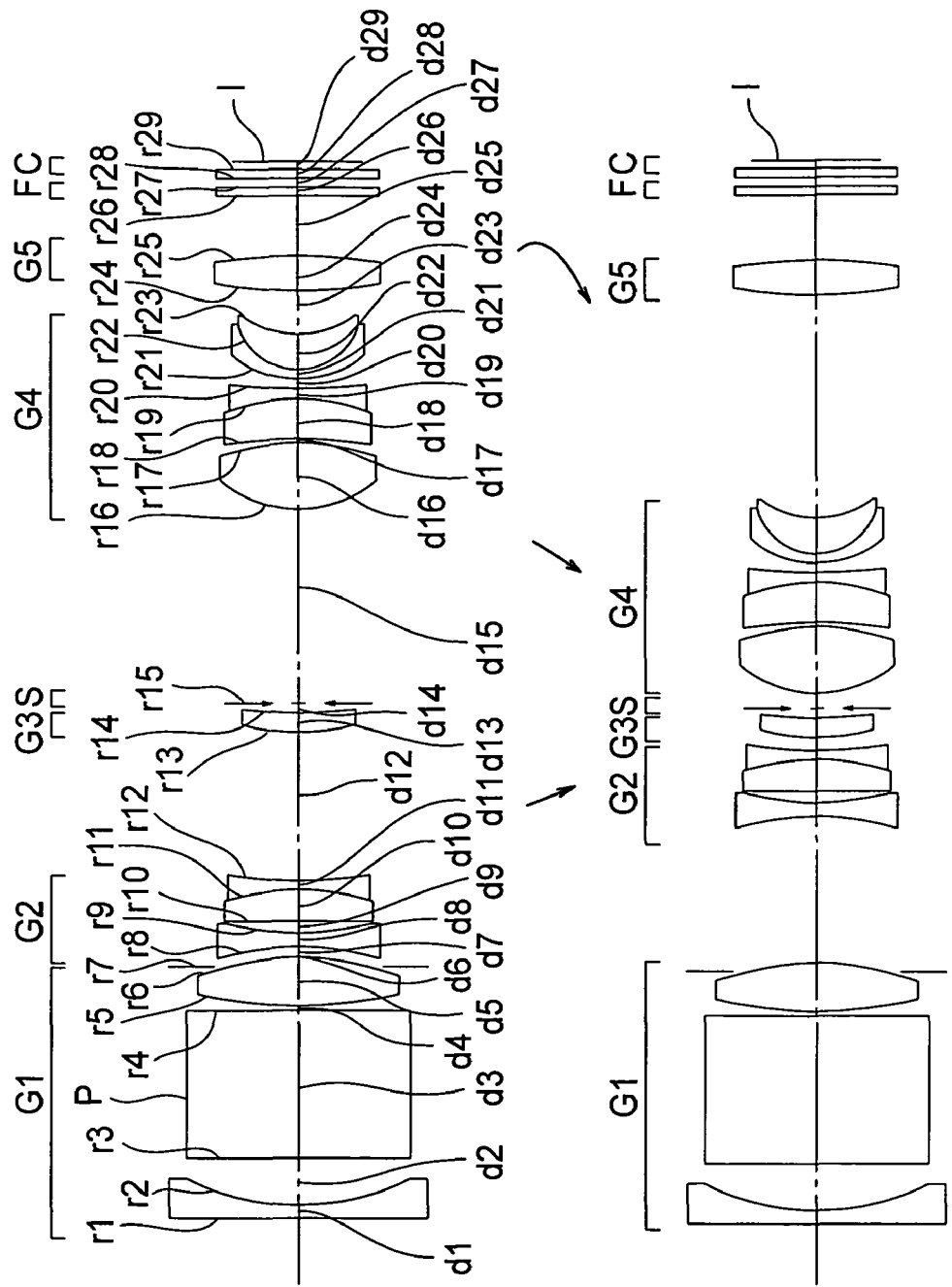
FIGS. 6A and 6B are cross sectional views of a zoom lens according to a sixth embodiment of the present invention in the state in which the zoom lens is focused on an object point at infinity at the wide angle end (FIG. 6A), and at the telephoto end (FIG. 6B) respectively.

As shown in FIGS. 6A and 6B, the zoom lens according to the sixth embodiment includes, in order from the object side, a first lens unit G1 having a positive refracting power, a second lens unit G2 having a negative refracting power, a third lens unit G3 having a positive refracting power, an aperture stop S, a fourth lens unit G4 having a positive refracting power, and a fifth lens unit G5 having a positive refracting power.

During zooming from the wide angle end to the telephoto end, the first lens unit G1 is fixed, the second lens unit G2 moves toward the image side, the third lens unit G3 is fixed, the fourth lens unit G4 moves toward the object side, and the fifth lens unit G5 moves first toward the image side, thereafter back toward the object side.

The first lens unit G1 is composed of a biconcave negative lens, a prism P for bending the optical path, and a biconvex positive lens. The second lens unit G2 is composed of a biconcave negative lens, and a cemented lens made up of a biconvex positive lens and a biconcave negative lens. The third lens unit G3 is composed of a positive meniscus lens having a convex surface directed toward the object side. The fourth lens unit G4 is composed of a biconvex positive lens, a cemented lens made up of a positive meniscus lens having a convex surface directed toward the image side and a biconcave negative lens, and a cemented lens made up of a negative meniscus lens having a convex surface directed toward the object side and a positive meniscus lens having a convex surface directed toward the object side. The fifth lens unit G5 is composed of a biconvex positive lens. The lens elements in each lens unit G1, G2, G3, G4, G5 are arranged in the mentioned order from the object side.

There are eight aspheric surfaces, which include both surfaces of the biconvex positive lens in the first lens unit G1, both surfaces of the object side biconcave negative lens in the second lens unit G2, both surfaces of the biconvex positive lens in the fourth lens unit G4, and both surfaces of the biconvex positive lens in the fifth lens unit G5.

Figures 7A, 7B:
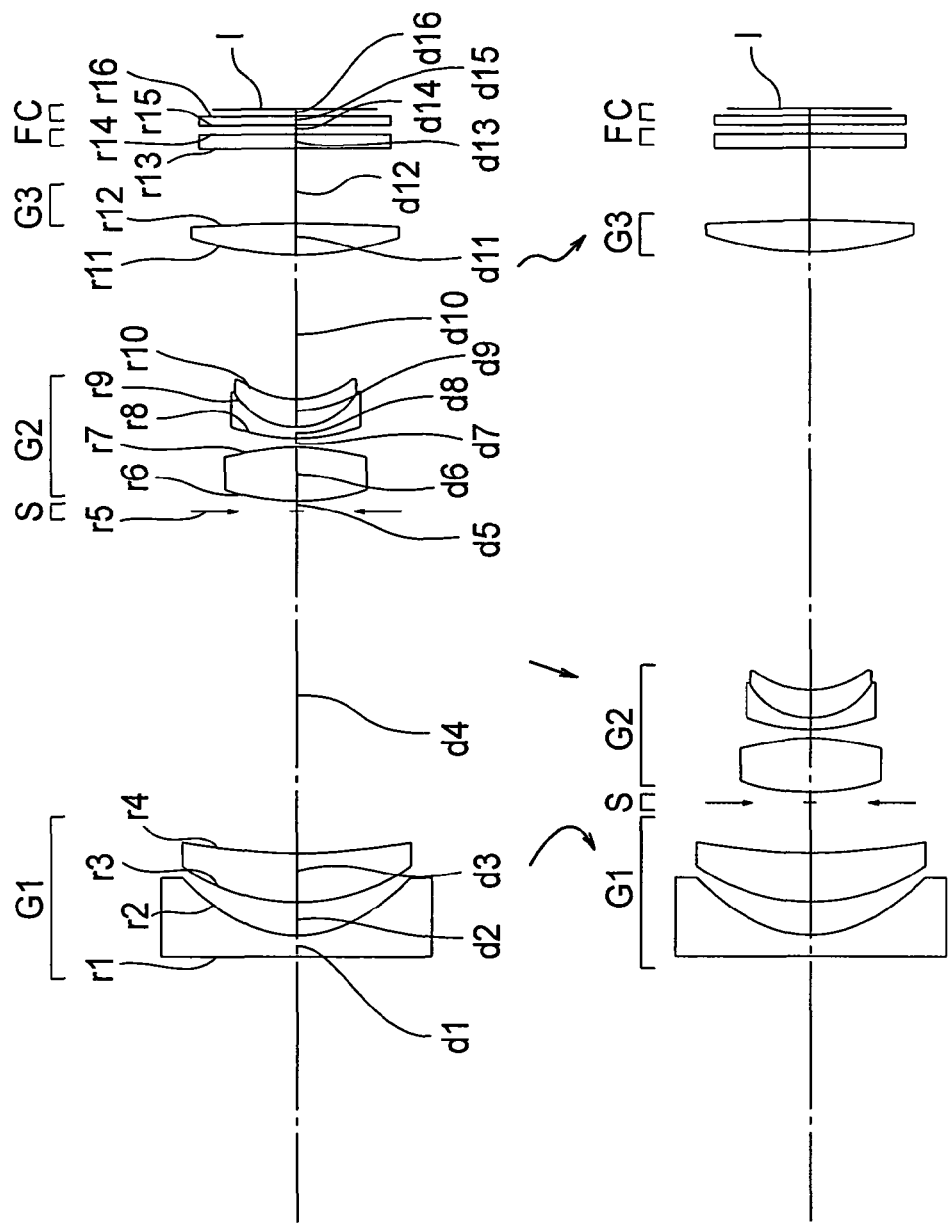
FIGS. 7A and 7B are cross sectional views of a zoom lens according to a seventh embodiment of the present invention in the state in which the zoom lens is focused on an object point at infinity at the wide angle end (FIG. 7A), and at the telephoto end (FIG. 7B) respectively.

As shown in FIGS. 7A and 7B, the zoom lens according to the seventh embodiment includes, in order from the object side, a first lens unit G1 having a negative refracting power, a aperture stop S, a second lens unit G2 having a positive refracting power, and a third lens unit G3 having a positive refracting power.

During zooming from the wide angle end to the telephoto end, the first lens unit G1 moves first toward the image side, thereafter back toward the object side, the second lens unit G2 moves toward the object side, and the third lens unit G3 moves first toward the image side, thereafter toward the object side, still thereafter back toward the image side.

The first lens unit G1 is composed of a negative meniscus lens having a convex surface directed toward the object side, and a positive meniscus lens having a convex surface directed toward the object side. The second lens unit G2 is composed of a biconvex positive lens, and a cemented lens made up of a negative meniscus lens having a convex surface directed toward the object side and a positive meniscus lens having a convex surface directed toward the object side. The third lens unit G3 is composed of a biconvex positive lens. The lens elements in each lens unit G1, G2, G3 are arranged in the mentioned order from the object side.

There are four aspheric surfaces, which include the image side surface of the negative meniscus lens in the first lens unit G1, both surfaces of the biconvex positive lens in the second lens unit G2, the image both surfaces of the biconvex positive lens in the third lens unit G3.

Figures 8A, 8B:
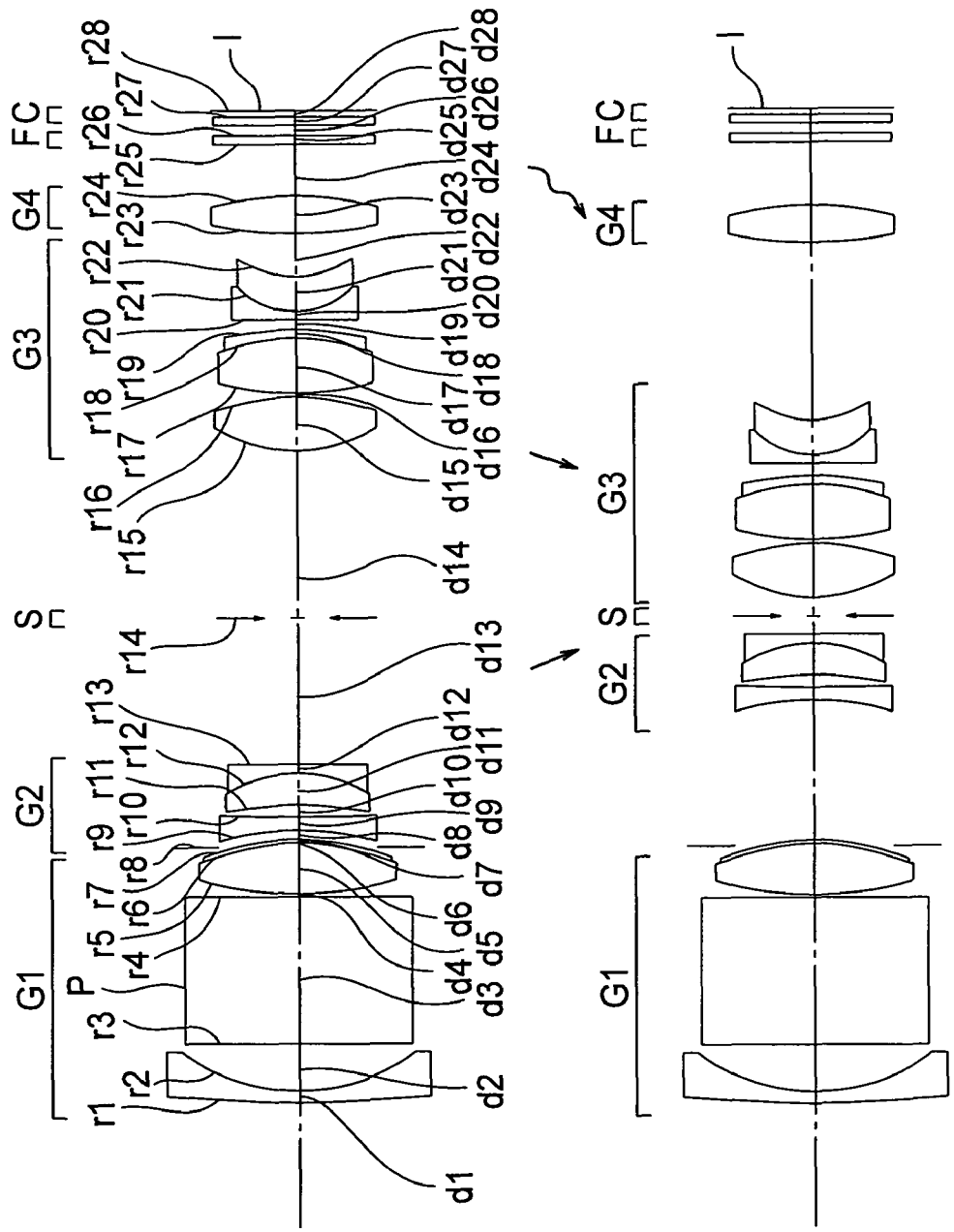
FIGS. 8A and 8B are cross sectional views of a zoom lens according to a eighth embodiment of the present invention in the state in which the zoom lens is focused on an object point at infinity at the wide angle end (FIG. 8A), and at the telephoto end (FIG. 8B) respectively.

As shown in FIGS. 8A and 8B, the zoom lens according to the eighth embodiment includes, in order from the object side, a first lens unit G1 having a positive refracting power, a second lens unit G2 having a negative refracting power, an aperture stop S, a third lens unit G3 having a positive refracting power, and a fourth lens unit G4 having a positive refracting power.

During zooming from the wide angle end to the telephoto end, the first lens unit G1 is fixed, the second lens unit G2 moves toward the image side, the third lens unit G3 moves toward the object side, and the fourth lens unit G4 moves first toward the image side, thereafter toward the object side, still thereafter back toward the image side, and finally toward the object side.

The first lens unit G1 is composed of a negative meniscus lens having a convex surface directed toward the object side, a prism P for bending the optical path, and a cemented lens made up of a biconvex positive lens and a positive meniscus lens having a convex surface directed toward the image side. The second lens unit G2 is composed of a biconcave negative lens, and a cemented lens made up of a positive meniscus lens having a convex surface directed toward the image side and a plano-concave negative lens. The third lens unit G3 is composed of a biconvex positive lens, a cemented lens made up of a biconvex positive lens and a negative meniscus lens having a convex surface directed toward the image side, and a cemented lens made up of a negative meniscus lens having a convex surface directed toward the object side and a positive meniscus lens having a convex surface directed toward the object side. The fourth lens unit G4 is composed of a biconvex positive lens. The lens elements in each lens unit G1, G2, G3, G4 are arranged in the mentioned order from the object side.

There are six aspheric surfaces, which include both surfaces of the biconvex positive lens in the first lens unit G1, both surfaces of the object side biconvex positive lens in the third lens unit G3, and both surfaces of the biconvex positive lens in the fourth lens unit G4.

Figures 9A, 9B:
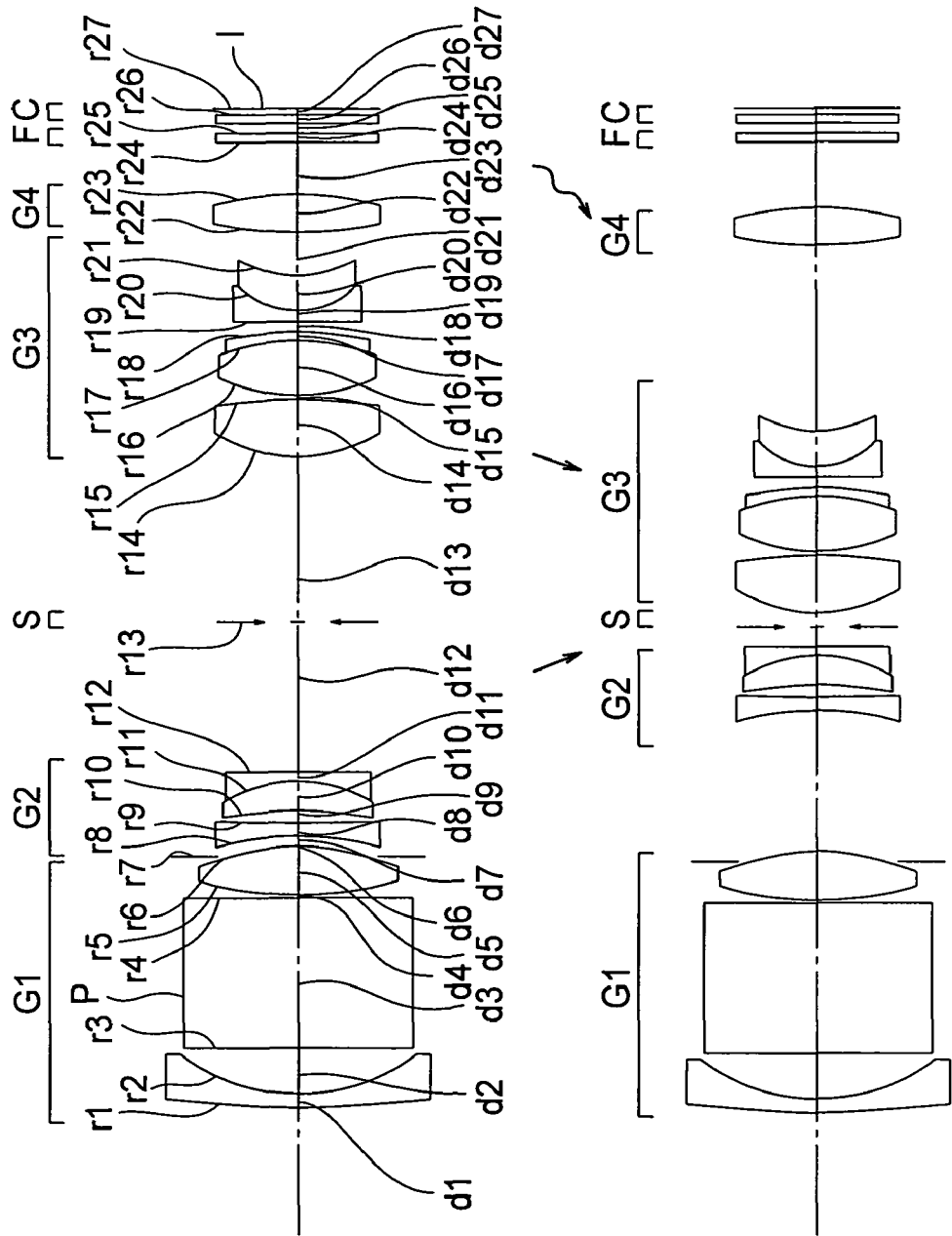
FIGS. 9A and 9B are cross sectional views of a zoom lens according to a ninth embodiment of the present invention in the state in which the zoom lens is focused on an object point at infinity at the wide angle end (FIG. 9A), and at the telephoto end (FIG. 9B) respectively.
Figure 10A:
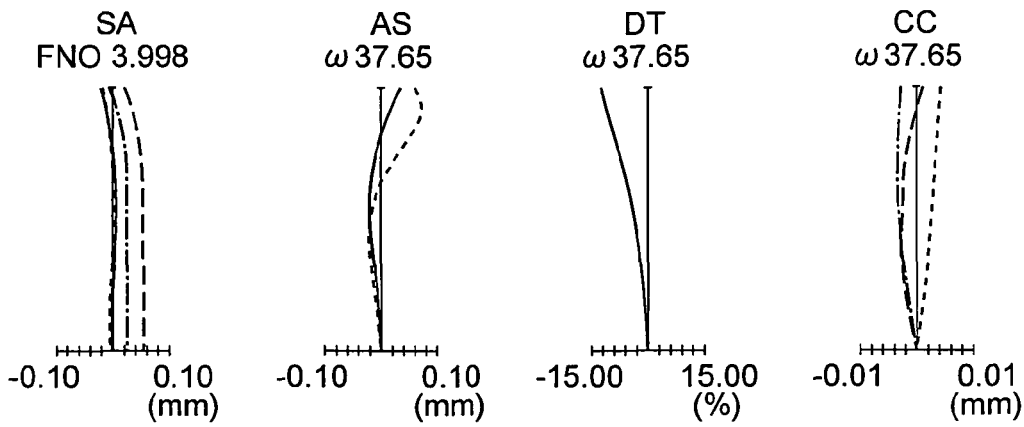
FIGS. 10A, 10B, and 10C show aberrations of the zoom lens according to the first embodiment in the state in which the zoom lens is focused on an object point at infinity.
Figure 10B:
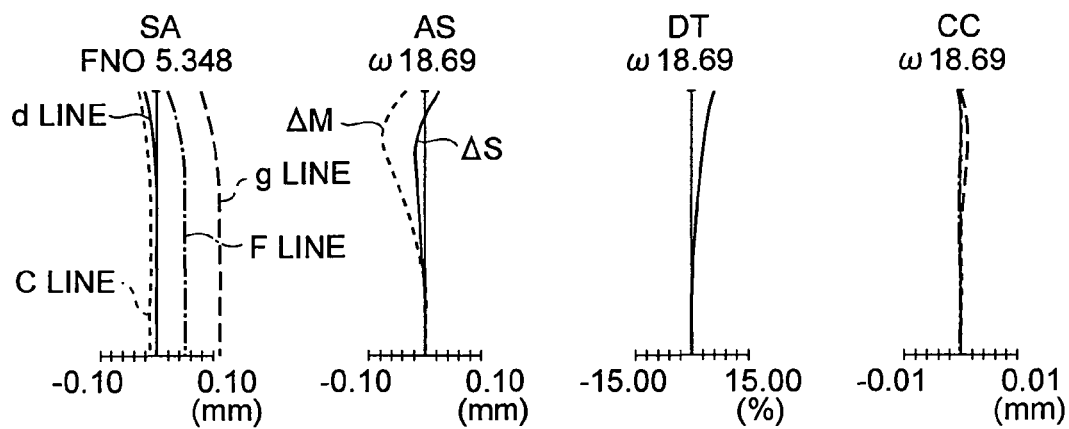
Figure 10C:
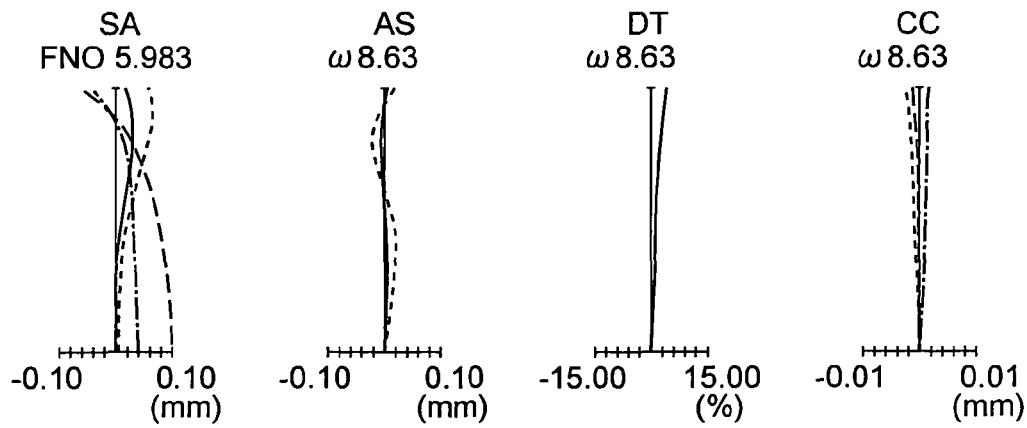
Figure 11A:
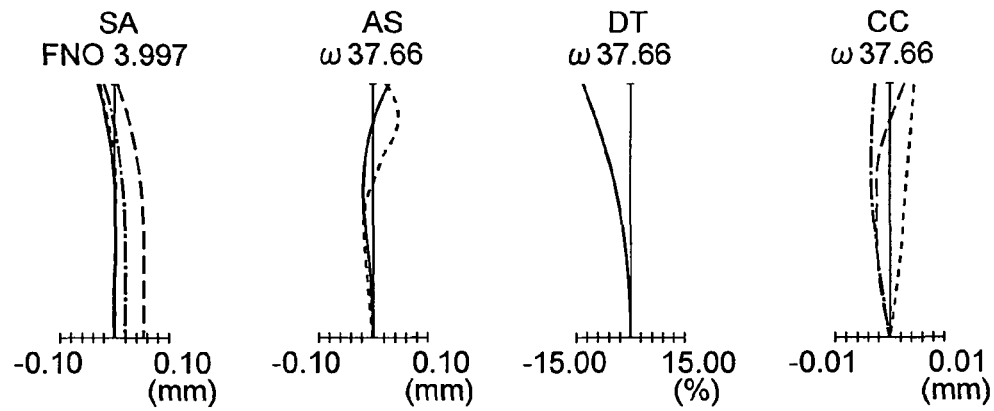
FIGS. 11A, 11B, and 11C show aberrations of the zoom lens according to the second embodiment in the state in which the zoom lens is focused on an object point at infinity.
Figure 11B:
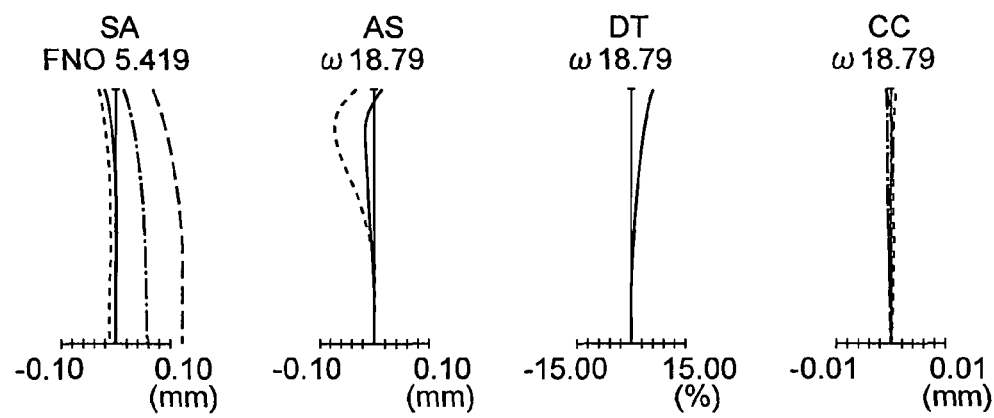
Figure 11C:
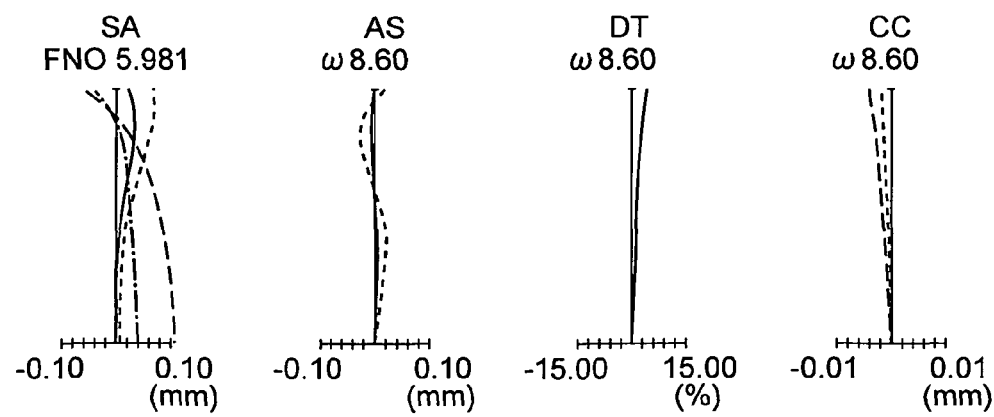
Figure 12A:
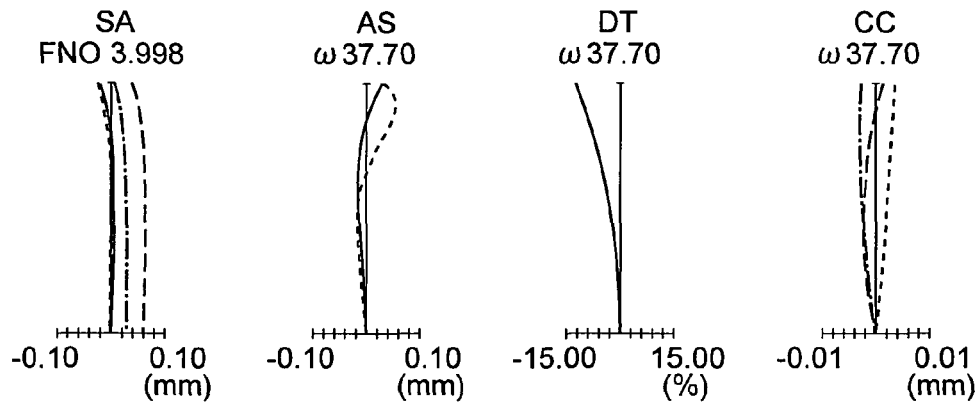
FIGS. 12A, 12B, and 12C show aberrations of the zoom lens according to the third embodiment in the state in which the zoom lens is focused on an object point at infinity.
Figure 12B:
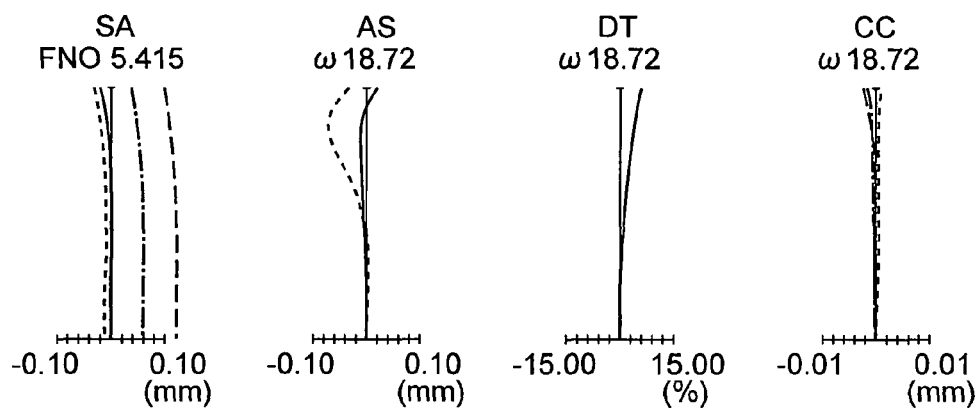
Figure 12C:
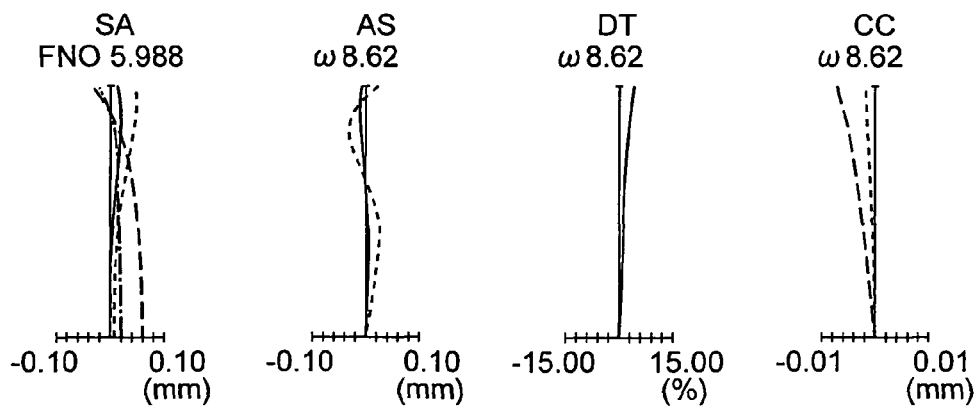
Figure 13A:
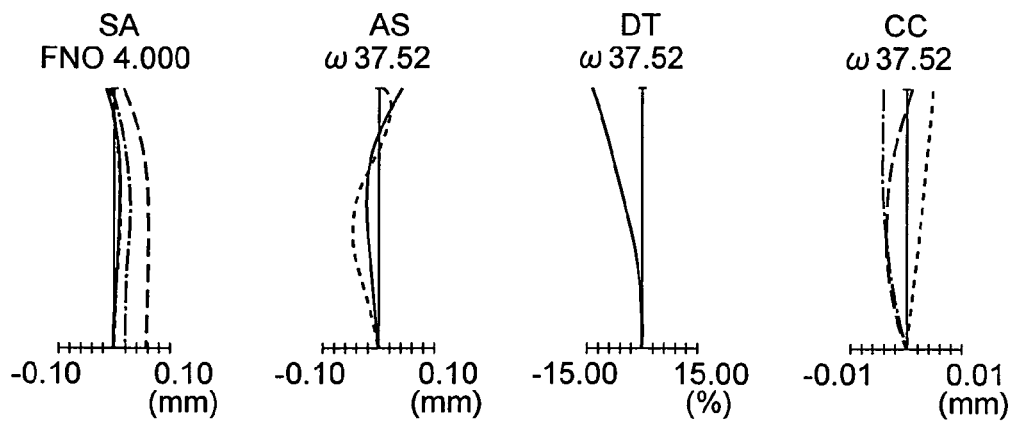
FIGS. 13A, 13B, and 13C show aberrations of the zoom lens according to the fourth embodiment in the state in which the zoom lens is focused on an object point at infinity.
Figure 13B:
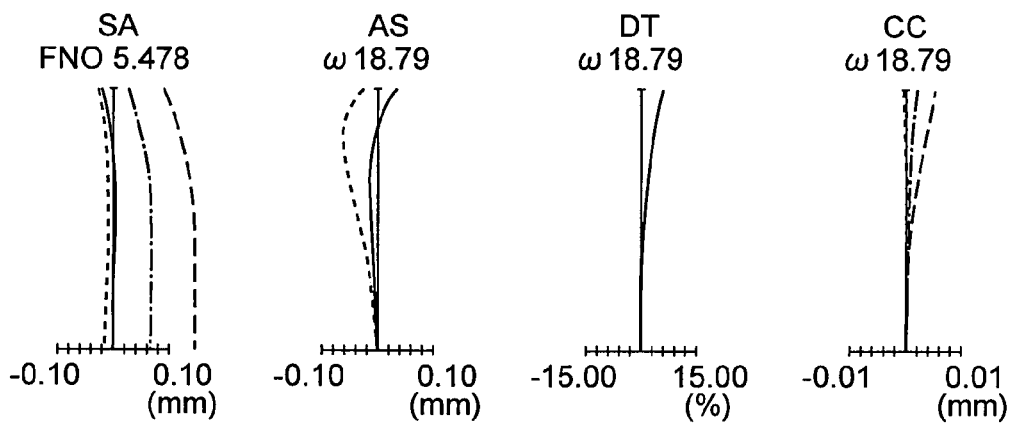
Figure 13C:
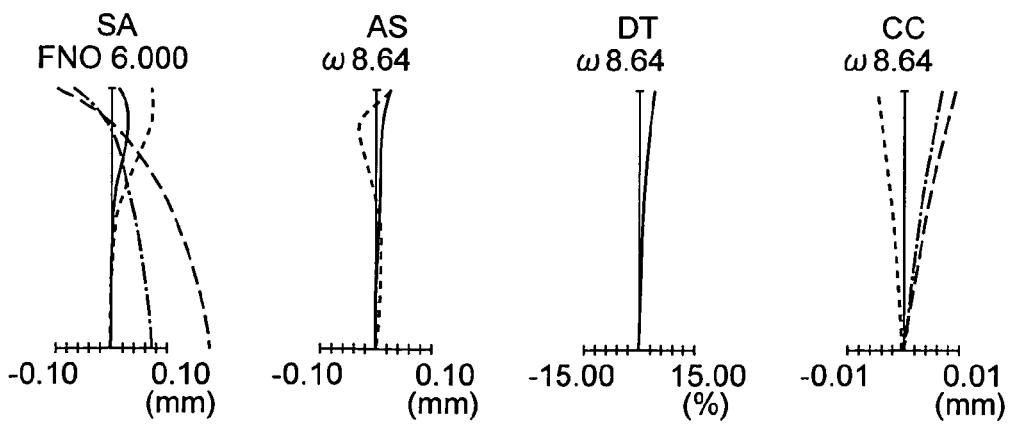
Figure 14A:
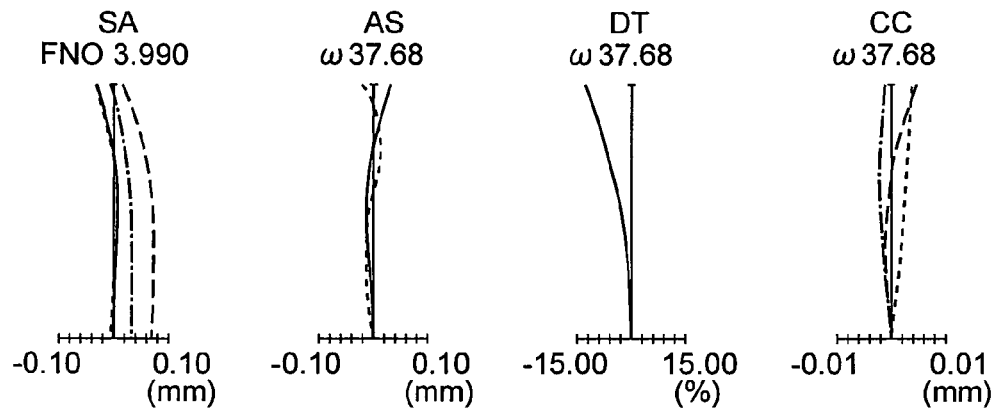
FIGS. 14A, 14B, and 14C show aberrations of the zoom lens according to the fifth embodiment in the state in which the zoom lens is focused on an object point at infinity.
Figure 14B:
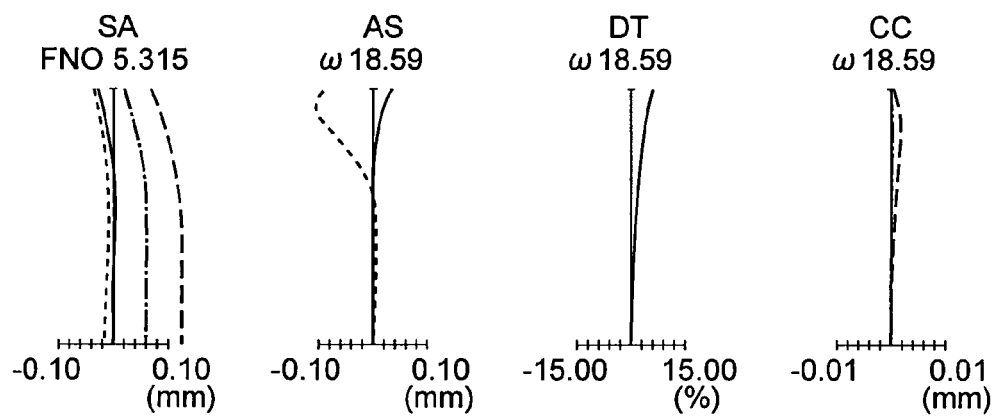
Figure 14C:
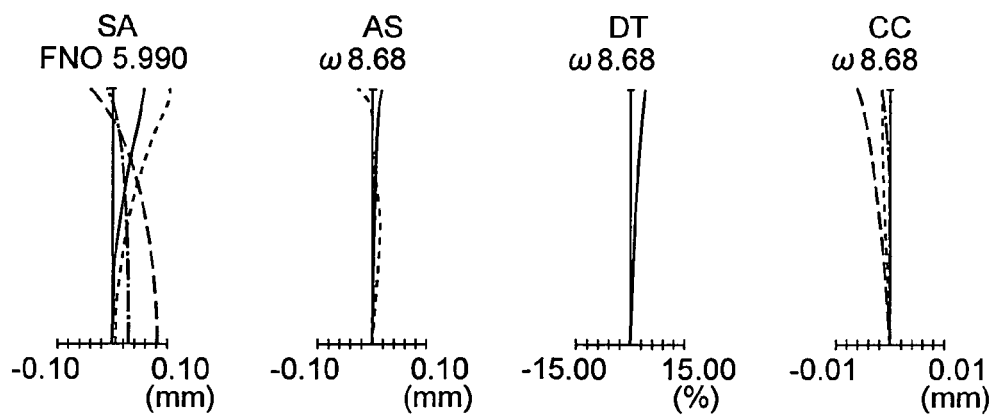
Figure 15A:
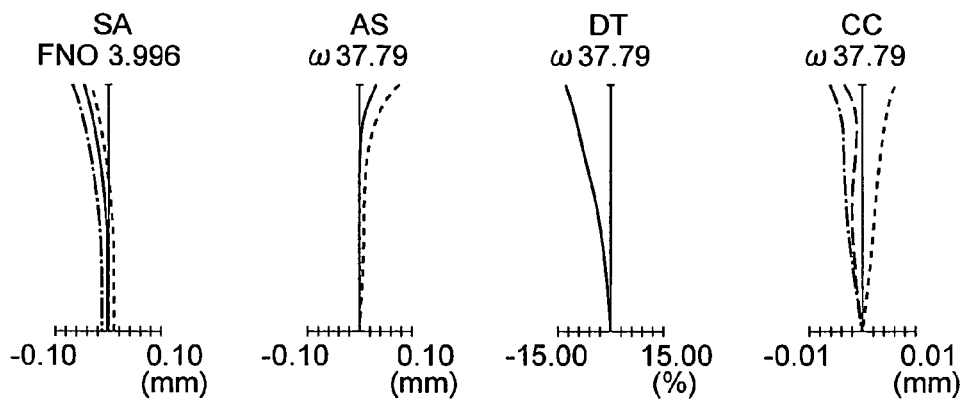
FIGS. 15A, 15B, and 15C show aberrations of the zoom lens according to the sixth embodiment in the state in which the zoom lens is focused on an object point at infinity.
Figure 15B:
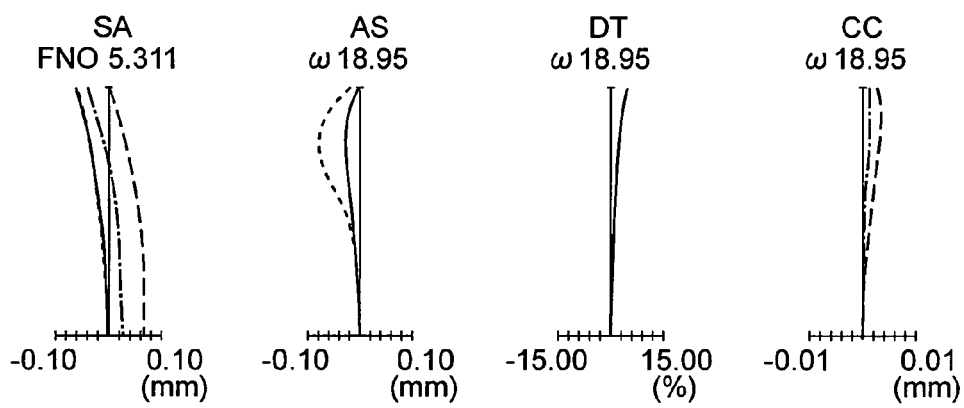
Figure 15C:
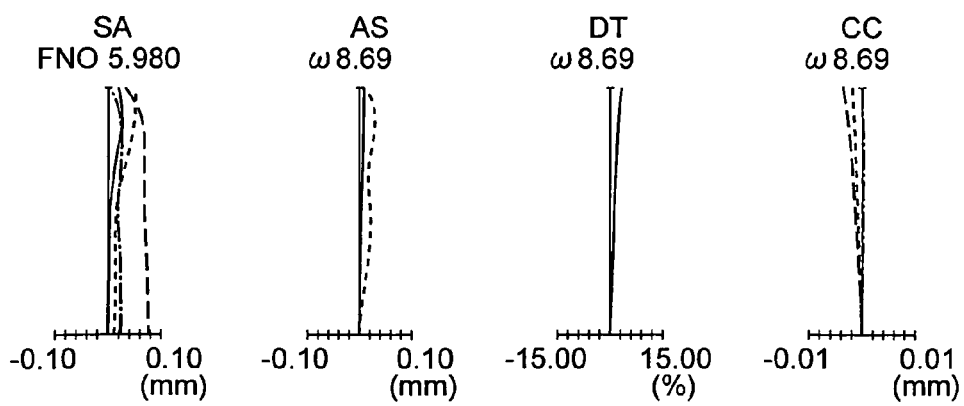
Figure 16A:
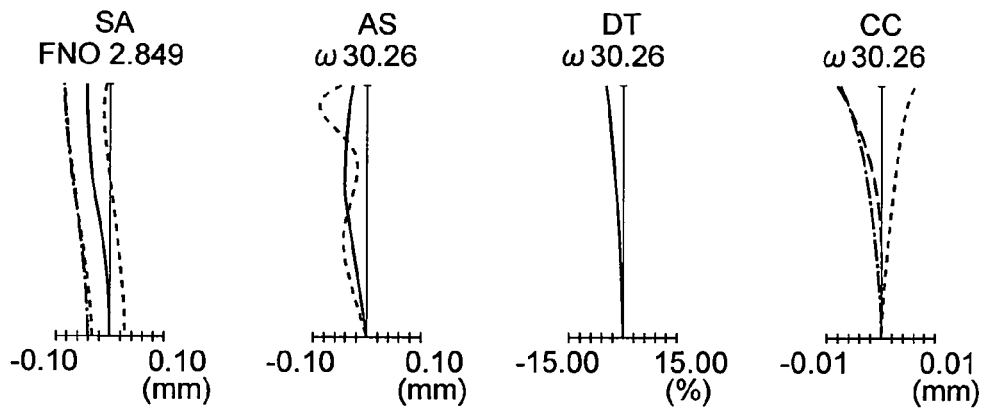
FIGS. 16A, 16B, 16C show aberrations of the zoom lens according to the seventh embodiment in the state in which the zoom lens is focused on an object point at infinity.
Figure 16B:
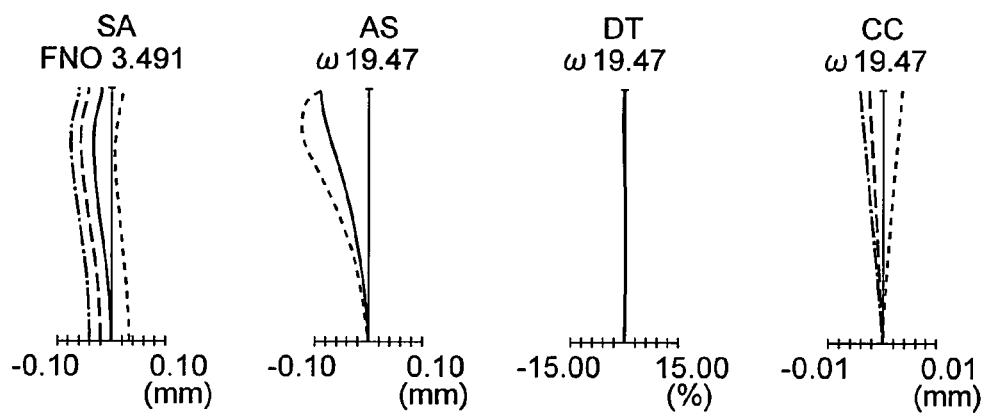
Figure 16C:
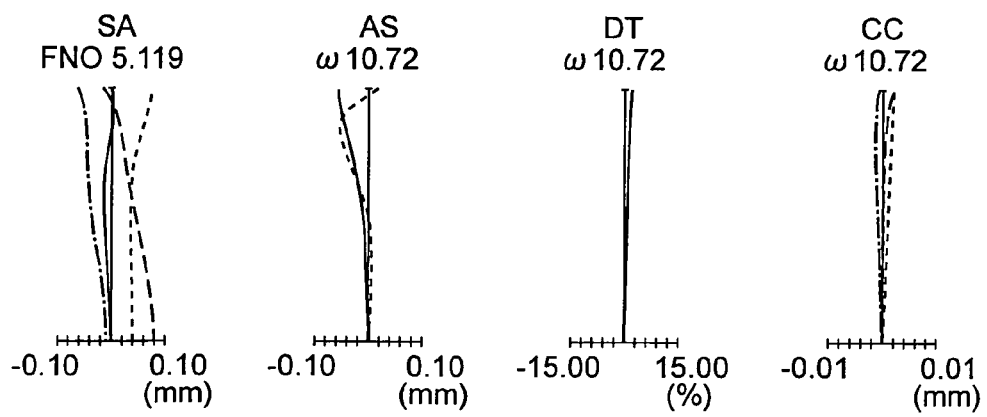
Figure 17A:
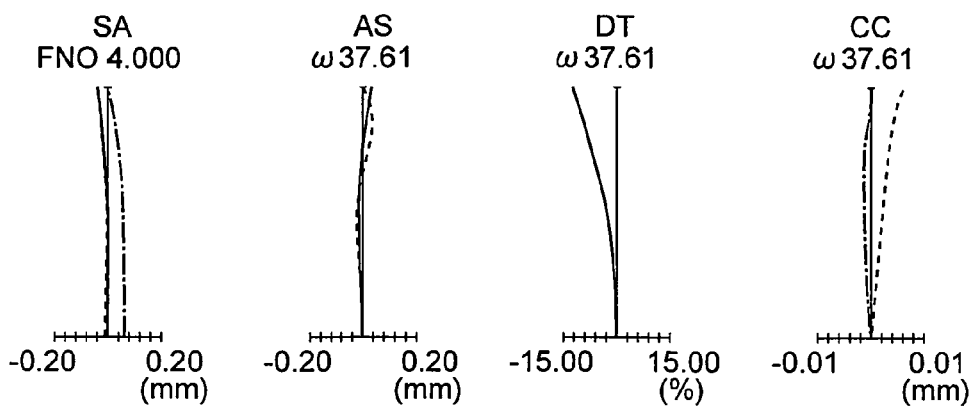
FIGS. 17A, 17B, and 17C show aberrations of the zoom lens according to the eighth embodiment in the state in which the zoom lens is focused on an object point at infinity.
Figure 17B:
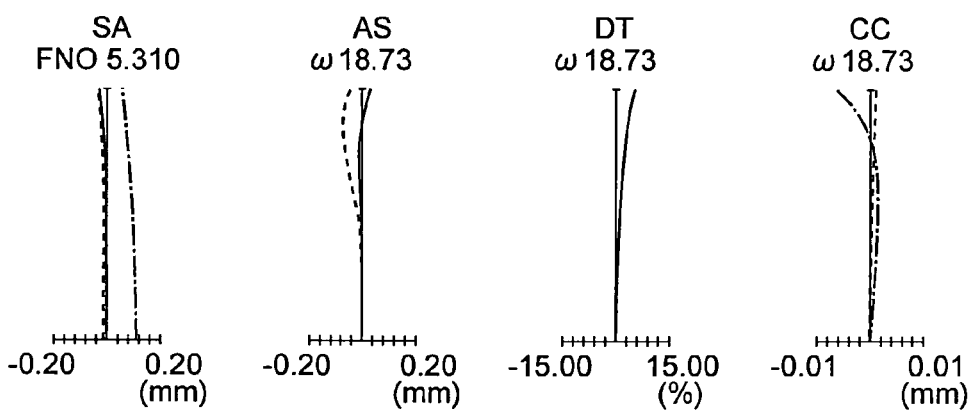
Figure 17C:
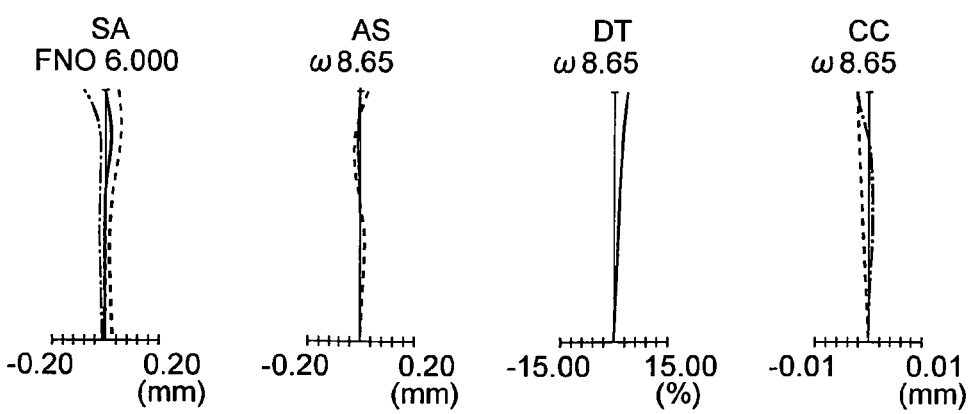
Figure 18A:
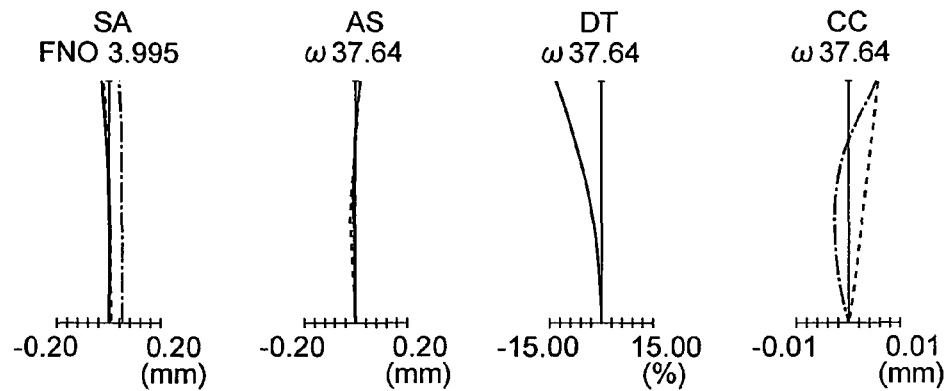
Figure 18B:
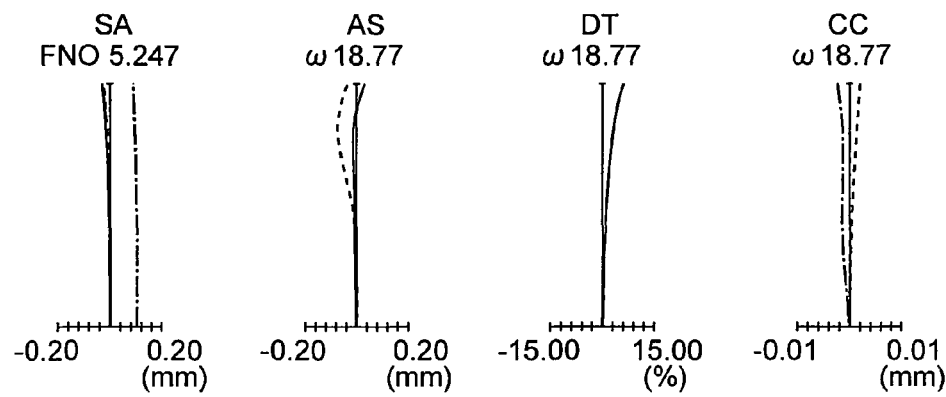
Figure 18C:
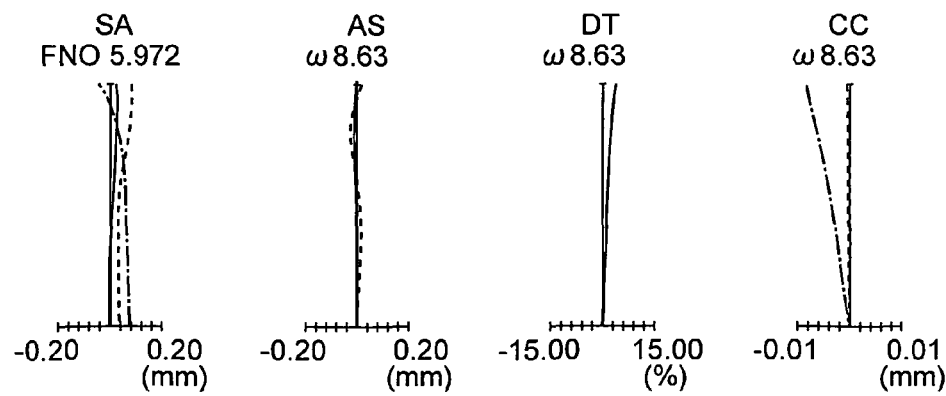

As shown in FIGS. 9A and 9B, the zoom lens according to the ninth embodiment includes, in order from the object side, a first lens unit G1 having a positive refracting power, a second lens unit G2 having a negative refracting power, an aperture stop S, a third lens unit G3 having a positive refracting power, and a fourth lens unit G4 having a positive refracting power.

During zooming from the wide angle end to the telephoto end, the first lens unit G1 is fixed, the second lens unit G2 moves toward the image side, the third lens unit G3 moves toward the object side, and the fourth lens unit G4 moves first toward the image side, thereafter toward the object side, still thereafter back toward the image side, and finally toward the object side.

The first lens unit G1 is composed of a negative meniscus lens having a convex surface directed toward the object side, a prism P for bending the optical path, and a biconvex positive lens. The second lens unit G2 is composed of a biconcave negative lens, and a cemented lens made up of a positive meniscus lens having a convex surface directed toward the image side and a biconcave negative lens. The third lens unit G3 is composed of a biconvex positive lens, a cemented lens made up of a biconvex positive lens and a negative meniscus lens having a convex surface directed toward the image side, and a cemented lens made up of a biconcave negative lens and a positive meniscus lens having a convex surface directed toward the object side. The fourth lens unit G4 is composed of a biconvex positive lens. The lens elements in each lens unit G1, G2, G3, G4 are arranged in the mentioned order from the object side.

There are eight aspheric surfaces, which include both surfaces of the biconvex positive lens in the first lens unit G1, both surfaces of the object side biconcave negative lens in the second lens unit G2, the object side surface of the second biconvex positive lens counted from the object side in the third lens unit G3, the image side surface of the negative meniscus lens in the third lens unit G3, and both surfaces of the biconvex positive lens in the fourth lens unit G4.

Numerical data of each embodiment described above is shown below. Apart from symbols described above, f denotes a focal length of the entire zoom lens system, BF denotes a back focus, f1, f2 . . . denotes a focal length of each of lens unit, IH denotes an image height, $F_{NO}$ denotes an F number, ω denotes a half angle of field, WE denotes a wide angle end, ST1 denotes a first intermediate state, ST2 denotes a second intermediate state, ST3 denotes a third intermediate state, TE denotes a telephoto end, each of r1, r2, . . . denotes radius of curvature of each lens surface, each of d1, d2, . . . denotes a distance between two lenses, each of nd1, nd2, . . . denotes a refractive index of each lens for a d-line, and each of vd1, vd2, . . . denotes an Abbe constant for each lens.

The overall length of the lens system which will be described later is a length which is obtained by adding the back focus to a distance from the first lens surface up to the last lens surface. BF (back focus) is a unit which is expressed upon air conversion of a distance from the last lens surface up to a paraxial image plane.

Further, * denotes an aspheric data.

When x is let to be an optical axis with a direction of traveling of light as a positive (direction), and y is let to be in a direction orthogonal to the optical axis, a shape of the aspheric surface is described by the following expression.

$$x=(y^2/r)/[1+\{1-(K+1)(y/r)^2\}^{1/2}]+A_4y^4+A_6y^6+A_8y^8+A_{10}y^{10}+A_{12}y^{12}$$

where, r denotes a paraxial radius of curvature, K denotes a conical coefficient, A4, A6, A8, A10, and $A_{12}$ denote aspherical surface coefficients of a fourth order, a sixth order, an eight order, a tenth order, and a twelfth order respectively. Moreover, in the aspherical surface coefficients, 'e-n' (where, n is an integral number) indicates '$10^{-n}$'.

Example 1

Unit mm

Surface data

| Surface no. | r | d | nd | vd |
|---|---|---|---|---|
| Object plane | ∞ | ∞ | | |
| 1 | 44.268 | 0.68 | 2.00069 | 25.46 |
| 2 | 10.041 | 2.56 | | |
| 3 | ∞ | 8.05 | 1.84666 | 23.78 |
| 4 | ∞ | 0.20 | | |
| 5* | 17.697 | 2.69 | 1.69350 | 53.21 |
| 6* | −11.939 | −0.49 | | |
| 7 | ∞ | Variable | | |
| 8* | −12.054 | 0.68 | 1.80610 | 40.92 |
| 9* | 33.144 | 0.60 | | |
| 10 | −23.549 | 1.68 | 1.92286 | 20.88 |
| 11 | −8.026 | 0.47 | 1.81600 | 46.62 |
| 12 | 292.962 | Variable | | |
| 13 (Stop) | ∞ | Variable | | |
| 14* | 6.573 | 2.75 | 1.49700 | 81.54 |
| 15* | −15.251 | 0.20 | | |
| 16 | 16.049 | 3.86 | 1.49700 | 81.54 |
| 17 | −5.608 | 0.49 | 1.72916 | 54.68 |
| 18 | −91.909 | 0.58 | | |
| 19 | 8.366 | 0.49 | 2.00069 | 25.46 |
| 20 | 4.072 | 1.92 | 1.58913 | 61.14 |
| 21 | 4.667 | Variable | | |
| 22* | 14.080 | 1.79 | 1.53071 | 55.60 |
| 23* | −87.113 | Variable | | |
| 24 | ∞ | 0.49 | 1.51633 | 64.14 |
| 25 | ∞ | 0.49 | | |
| 26 | ∞ | 0.49 | 1.51633 | 64.14 |
| 27 | ∞ | 0.36 | | |
| Image plane | ∞ | | | |

Aspherical surface data

5th surface

K = 0.000
A4 = −1.30296e−05, A6 = −1.72516e−07, A8 = −4.57973e−08,
A10 = −3.65013e−11

6th surface

K = 0.086
A4 = 1.58156e−04, A6 = −6.04002e−07, A8 = −2.35725e−08,
A10 = −1.70443e−10

8th surface

K = 0.000
A4 = −8.39738e−05, A6 = −8.39070e−06, A8 = 1.61015e−06,
A10 = −7.56838e−08

9th surface

K = 0.000
A4 = −3.54978e−04, A6 = 4.67756e−06, A8 = 7.65112e−07,
A10 = −8.00342e−08

14th surface

K = 0.000
A4 = −4.36499e−04, A6 = 5.54224e−06, A8 = −1.82664e−07,
A10 = 2.19117e−09

15th surface

K = 0.000
A4 = 9.50329e−05, A6 = 6.87659e−06, A8 = −7.97347e−08,

22nd surface

K = 0.000
A4 = −5.98640e−05, A6 = 1.80063e−05, A8 = −4.78540e−06,
A10 = 1.97820e−07

23rd surface

K = 0.000
A4 = 1.21699e−05, A6 = −4.87808e−06, A8 = −3.87705e−06,
A10 = 1.83990e−07

Zoom data (∞)
Image height 3.84
Zoom ratio 4.8

| | WE | ST1 | ST2 | ST3 | TE |
|---|---|---|---|---|---|
| Focal length | 5.13 | 6.98 | 10.70 | 16.98 | 24.42 |
| Fno. | 4.00 | 4.57 | 5.35 | 4.72 | 5.98 |
| Angle of field 2ω | 75.30 | 57.48 | 37.38 | 24.15 | 17.25 |
| BF (in air) | 4.55 | 4.46 | 4.71 | 4.55 | 5.13 |
| Lens total length | 53.71 | 53.71 | 53.72 | 53.69 | 53.73 |
| d7 | 1.05 | 2.64 | 4.94 | 6.79 | 7.78 |
| d12 | 7.50 | 5.91 | 3.62 | 1.74 | 0.79 |
| d13 | 9.01 | 7.63 | 5.96 | 3.58 | 0.79 |
| d21 | 2.40 | 3.87 | 5.29 | 7.83 | 10.04 |
| d23 | 3.05 | 2.96 | 3.22 | 3.05 | 3.63 |

Unit focal length

| f1 = 13.41 | f2 = −8.22 | f3 = 10.39 | f4 = 22.98 |
|---|---|---|---|

Example 2

Unit mm

Surface data

| Surface no. | r | d | nd | vd |
|---|---|---|---|---|
| Object plane | ∞ | ∞ | | |
| 1 | 45.367 | 0.70 | 2.00069 | 25.46 |
| 2 | 10.211 | 2.62 | | |
| 3 | ∞ | 8.15 | 1.84666 | 23.78 |
| 4 | ∞ | 0.20 | | |
| 5* | 18.133 | 2.75 | 1.69350 | 53.21 |
| 6* | −12.328 | −0.50 | | |
| 7 | ∞ | Variable | | |
| 8* | −13.044 | 0.70 | 1.80610 | 40.92 |
| 9* | 27.069 | 0.61 | | |
| 10 | −25.280 | 1.72 | 1.92286 | 20.88 |
| 11 | −8.311 | 0.48 | 1.81600 | 46.62 |
| 12 | 45349.404 | Variable | | |
| 13 (Stop) | ∞ | Variable | | |
| 14* | 7.124 | 2.82 | 1.49700 | 81.54 |
| 15* | −12.115 | 0.20 | | |
| 16 | 15.022 | 3.68 | 1.49700 | 81.54 |
| 17 | −11.056 | 0.50 | 1.72916 | 54.68 |
| 18 | 39.806 | 0.59 | | |
| 19 | 9.681 | 0.50 | 2.00069 | 25.46 |
| 20 | 4.151 | 1.96 | 1.58913 | 61.14 |
| 21 | 5.150 | Variable | | |

-continued

Unit mm

| | | | | |
|---|---|---|---|---|
| 22* | 13.625 | 1.89 | 1.53071 | 55.60 |
| 23* | −58.989 | Variable | | |
| 24 | ∞ | 0.50 | 1.51633 | 64.14 |
| 25 | ∞ | 0.50 | | |
| 26 | ∞ | 0.50 | 1.51633 | 64.14 |
| 27 | ∞ | 0.37 | | |
| Image plane | ∞ | | | |

Aspherical surface data

5th surface

K = 0.000
A4 = −1.22163e−05,   A6 = −2.34407e−07,
A8 = −4.06884e−08,   A10 = −2.99503e−11
6th surface K = 0.140
A4 = 1.46270e−04,   A6 = −6.27948e−07,
A8 = −2.03499e−08,   A10 = −1.52656e−10
8th surface K = 0.000
A4 = −1.88973e−04,   A6 = −6.18139e−06,
A8 = 1.82271e−06,   A10 = −9.11203e−08
9th surface K = 0.000
A4 = −4.30157e−04,   A6 = 4.38462e−06,
A8 = 1.43704e−06,   A10 = −1.22668e−07
14th surface K = 0.000
A4 = −4.86418e−04,   A6 = 7.93842e−07,
A8 = −4.63155e−08,   A10 = −8.65107e−10
15th surface K = 0.000
A4 = 1.90414e−04,   A6 = 2.21763e−06,
A8 = 1.49314e−08
22nd surface K = 0.000
A4 = 8.40704e−05,   A6 = 1.56758e−05,
A8 = −3.92428e−06,   A10 = 1.49197e−07
23rd surface K = 0.000
A4 = 2.40464e−04,   A6 = −3.02607e−06,
A8 = −3.51649e−06,   A10 = 1.51937e−07

Zoom data (∞)
Image height 3.84
Zoom ratio 4.8

| | WE | ST1 | ST2 | ST3 | TE |
|---|---|---|---|---|---|
| Focal length | 5.13 | 6.98 | 10.69 | 16.97 | 24.41 |
| Fno. | 4.00 | 4.64 | 5.42 | 4.71 | 5.98 |
| Angle of field 2ω | 75.32 | 57.92 | 37.59 | 24.15 | 17.20 |
| BF (in air) | 4.61 | 4.43 | 4.76 | 4.58 | 5.17 |
| Lens total length | 54.80 | 54.80 | 54.81 | 54.78 | 54.82 |
| d7 | 1.07 | 2.60 | 5.02 | 7.09 | 8.11 |
| d12 | 7.82 | 6.29 | 3.88 | 1.78 | 0.79 |
| d13 | 9.33 | 7.76 | 6.02 | 3.73 | 0.79 |
| d21 | 2.41 | 4.15 | 5.56 | 8.04 | 10.38 |
| d23 | 3.08 | 2.90 | 3.23 | 3.05 | 3.65 |

Unit focal length

| | | | |
|---|---|---|---|
| f1 = 13.99 | f2 = −8.60 | f3 = 10.76 | f4 = 21.05 |

Example 3

Unit mm

Surface data

| Surface no. | r | d | nd | νd |
|---|---|---|---|---|
| Object plane | ∞ | ∞ | | |
| 1 | 45.412 | 0.70 | 2.00069 | 25.46 |
| 2 | 10.211 | 2.62 | | |
| 3 | ∞ | 8.15 | 1.84666 | 23.78 |
| 4 | ∞ | 0.20 | | |
| 5* | 18.525 | 2.75 | 1.69350 | 53.21 |
| 6* | −12.193 | −0.50 | | |
| 7 | ∞ | Variable | | |
| 8* | −10.918 | 0.70 | 1.80610 | 40.92 |
| 9* | 26.906 | 0.61 | | |
| 10 | −46.388 | 1.72 | 1.92286 | 20.88 |
| 11 | −9.328 | 0.47 | 1.81600 | 46.62 |
| 12 | 300.524 | Variable | | |
| 13(Stop) | ∞ | Variable | | |
| 14* | 7.032 | 2.77 | 1.49700 | 81.54 |
| 15* | −14.045 | 0.20 | | |
| 16 | 13.624 | 3.59 | 1.49700 | 81.54 |
| 17 | −7.326 | 0.50 | 1.74400 | 44.78 |
| 18 | −23.826 | 0.59 | | |
| 19 | 15.833 | 0.50 | 1.90366 | 31.32 |
| 20 | 4.082 | 1.97 | 1.48749 | 70.23 |
| 21 | 4.954 | Variable | | |
| 22* | 15.665 | 1.90 | 1.53071 | 55.60 |
| 23* | −42.652 | Variable | | |
| 24 | ∞ | 0.50 | 1.51633 | 64.14 |
| 25 | ∞ | 0.50 | | |
| 26 | ∞ | 0.50 | 1.51633 | 64.14 |
| 27 | ∞ | 0.37 | | |
| Image plane | ∞ | | | |

Aspherical surface data

5th surface

κ = 0.000
A4 = −5.64757e−06, A6 = −1.75719e−07, A8 = −2.58535e−08,
A10 = −2.99503e−11
6th surface κ = 0.126
A4 = 1.51510e−04, A6 = −5.39429e−07, A8 = −6.26351e−09,
A10 = −1.88376e−10
8th surface κ = 0.000
A4 = 2.57960e−06, A6 = −8.09928e−06, A8 = 1.39945e−06,
A10 = −3.72977e−08
9th surface κ = 0.000
A4 = −3.16909e−04, A6 = 4.40570e−06, A8 = 2.29187e−07,
A10 = 1.93619e−08
14th surface κ = 0.000
A4 = −4.65776e−04, A6 = 2.60559e−06, A8 = −7.26532e−08,
A10 = 4.58490e−11
15th surface κ = 0.000
A4 = 1.87960e−04, A6 = 2.69455e−06, A8 = −6.05279e−10
22nd surface κ = 0.000
A4 = 8.34878e−05, A6 = 1.55562e−05, A8 = −3.05938e−06,
A10 = 1.18360e−07

-continued

Unit mm

23rd surface

κ = 0.000
A4 = 1.73085e−04, A6 = −3.84884e−06, A8 = −2.40611e−06,
A10 = 1.12921e−07

Zoom data (∞)
Image height 3.84
Zoom ratio 4.8

|  | WE | ST1 | ST2 | ST3 | TE |
|---|---|---|---|---|---|
| Focal length | 5.12 | 6.96 | 10.69 | 16.96 | 24.43 |
| Fno. | 4.00 | 4.61 | 5.42 | 4.74 | 5.99 |
| Angle of field 2ω | 75.40 | 57.80 | 37.43 | 24.18 | 17.24 |
| BF (in air) | 4.63 | 4.42 | 4.69 | 4.60 | 5.18 |
| Lens total length | 54.77 | 54.78 | 54.79 | 54.75 | 54.78 |
| d7 | 1.07 | 2.64 | 5.06 | 7.06 | 8.14 |
| d12 | 7.86 | 6.29 | 3.88 | 1.85 | 0.80 |
| d13 | 9.37 | 7.86 | 6.08 | 3.66 | 0.79 |
| d21 | 2.41 | 4.13 | 5.64 | 8.15 | 10.44 |
| d23 | 3.10 | 2.89 | 3.16 | 3.07 | 3.65 |

Unit focal length

| f1 = 14.02 | f2 = −8.63 | f3 = 10.78 | f4 = 21.83 |
|---|---|---|---|

Example 4

Unit mm

Surface data

| Surface no. | r | d | nd | vd |
|---|---|---|---|---|
| Object plane | ∞ | ∞ | | |
| 1 | 54.098 | 0.70 | 2.00069 | 25.46 |
| 2 | 11.134 | 2.62 | | |
| 3 | ∞ | 8.15 | 1.84666 | 23.78 |
| 4 | ∞ | 0.20 | | |
| 5* | 15.428 | 2.75 | 1.69350 | 53.21 |
| 6* | −12.285 | −0.50 | | |
| 7 | ∞ | Variable | | |
| 8* | −16.262 | 0.70 | 1.80610 | 40.92 |
| 9* | 51.613 | 0.61 | | |
| 10 | −13.276 | 1.72 | 1.92286 | 20.88 |
| 11 | −6.477 | 0.48 | 1.81600 | 46.62 |
| 12 | 45.774 | Variable | | |
| 13(Stop) | ∞ | Variable | | |
| 14* | 6.941 | 3.29 | 1.49700 | 81.54 |
| 15* | −11.820 | 0.20 | | |
| 16 | 10.707 | 2.95 | 1.49700 | 81.54 |
| 17 | −30.181 | 0.50 | 1.72916 | 54.68 |
| 18 | 24.007 | 0.59 | | |
| 19 | 8.282 | 0.50 | 2.00069 | 25.46 |
| 20 | 3.684 | 1.96 | 1.58913 | 61.14 |
| 21 | 4.711 | Variable | | |
| 22* | 22.945 | 1.37 | 1.53071 | 55.60 |
| 23* | −50.722 | Variable | | |
| 24 | ∞ | 0.50 | 1.51633 | 64.14 |
| 25 | ∞ | 0.50 | | |
| 26 | ∞ | 0.50 | 1.51633 | 64.14 |
| 27 | ∞ | 0.37 | | |
| Image plane | ∞ | | | |

Aspherical surface data

5th surface

κ = 0.000
A4 = −2.48617e−05, A6 = −5.42504e−07, A8 = −3.18389e−08,
A10 = −2.99503e−11

-continued

Unit mm

6th surface

κ = 0.103
A4 = 1.88581e−04, A6 = −1.34910e−06, A8 = −2.36497e−09,
A10 = −1.94675e−10
8th surface κ = 0.000
A4 = −2.35584e−04, A6 = −1.32204e−05, A8 = 3.15896e−06,
A10 = −2.25399e−07
9th surface κ = 0.000
A4 = −5.13060e−04, A6 = 4.01716e−06, A8 = 2.45377e−06,
A10 = −3.34588e−07
14th surface κ = 0.000
A4 = −5.82384e−04, A6 = 1.18291e−05, A8 = −2.42737e−07,
A10 = 2.48438e−09
15th surface κ = 0.000
A4 = 2.34088e−04, A6 = 1.27093e−05, A8 = −1.78669e−08
22nd surface κ = 0.000
A4 = −3.26238e−04, A6 = −2.47744e−05, A8 = 1.11619e−06,
A10 = 6.14421e−08
23rd surface κ = 0.000
A4 = −4.45339e−04, A6 = −3.24082e−05, A8 = 9.78994e−07,
A10 = 8.53031e−08

Zoom data (∞)
Image height 3.84
Zoom ratio 4.7

|  | WE | ST1 | ST2 | ST3 | TE |
|---|---|---|---|---|---|
| Focal length | 5.16 | 6.94 | 10.71 | 17.03 | 24.30 |
| Fno. | 4.00 | 4.70 | 5.48 | 4.76 | 6.00 |
| Angle of field 2ω | 75.03 | 58.74 | 37.57 | 24.08 | 17.27 |
| BF (in air) | 4.43 | 3.89 | 4.50 | 4.47 | 5.15 |
| Lens total length | 51.04 | 51.04 | 51.04 | 51.02 | 51.06 |
| d7 | 1.07 | 2.14 | 4.19 | 5.86 | 6.74 |
| d12 | 6.37 | 5.30 | 3.25 | 1.56 | 0.74 |
| d13 | 8.08 | 6.66 | 5.15 | 3.08 | 0.74 |
| d21 | 2.30 | 4.26 | 5.16 | 7.26 | 8.91 |
| d23 | 2.90 | 2.36 | 2.97 | 2.94 | 3.62 |

Unit focal length

| f1 = 12.17 | f2 = −7.08 | f3 = 9.21 | f4 = 29.96 |
|---|---|---|---|

Example 5

Unit mm

Surface data

| Surface no. | r | d | nd | vd |
|---|---|---|---|---|
| Object plane | ∞ | ∞ | | |
| 1 | 56.000 | 0.70 | 2.00069 | 25.46 |
| 2 | 10.344 | 2.53 | | |
| 3 | ∞ | 8.17 | 1.84666 | 23.78 |
| 4 | ∞ | 0.20 | | |
| 5* | 17.890 | 2.73 | 1.69300 | 53.14 |
| 6* | −12.358 | −0.50 | | |
| 7 | ∞ | Variable | | |

-continued

Unit mm

| | | | | |
|---|---|---|---|---|
| 8* | −14.030 | 0.70 | 1.74283 | 49.33 |
| 9* | 23.985 | 0.67 | | |
| 10 | −27.503 | 1.77 | 1.92286 | 20.88 |
| 11 | −8.238 | 0.50 | 1.88300 | 40.76 |
| 12 | 38553.003 | Variable | | |
| 13(Stop) | ∞ | Variable | | |
| 14* | 6.817 | 3.07 | 1.49650 | 81.61 |
| 15* | −10.469 | 0.20 | | |
| 16 | 14.000 | 3.07 | 1.49700 | 81.54 |
| 17 | −14.000 | 0.50 | 1.58144 | 40.75 |
| 18 | 150.454 | 0.59 | | |
| 19 | 30.000 | 0.50 | 1.90366 | 31.32 |
| 20 | 4.092 | 1.98 | 1.48749 | 70.23 |
| 21 | 5.494 | Variable | | |
| 22* | 14.051 | 2.14 | 1.53071 | 55.60 |
| 23* | −38.693 | Variable | | |
| 24 | ∞ | 0.50 | 1.51633 | 64.14 |
| 25 | ∞ | 0.50 | | |
| 26 | ∞ | 0.50 | 1.51633 | 64.14 |
| 27 | ∞ | 0.37 | | |
| Image plane | ∞ | | | |

Aspherical surface data

5th surface $\kappa = 0.000$
A4 = 3.64858e−06, A6 = −1.83257e−06, A8 = 1.05230e−07,
A10 = −3.19943e−09

6th surface $\kappa = 0.000$
A4 = 1.54747e−04, A6 = −2.12125e−06, A8 = 1.11612e−07,
A10 = −3.07120e−09

8th surface $\kappa = 0.000$
A4 = −2.93079e−04, A6 = 1.70515e−05, A8 = −4.32202e−07,
A10 = −1.94880e−09

9th surface $\kappa = 0.000$
A4 = −5.53530e−04, A6 = 2.96255e−05, A8 = −1.02726e−06,
A10 = −1.82092e−09

14th surface $\kappa = 0.000$
A4 = −6.01800e−04, A6 = 2.02955e−06, A8 = −3.78318e−07,
A10 = −5.72163e−10

15th surface $\kappa = 0.000$
A4 = 3.62117e−04, A6 = 1.47008e−06, A8 = −2.56178e−07

22nd surface $\kappa = 0.000$
A4 = 3.32803e−04, A6 = −2.78018e−06, A8 = −1.08216e−06,
A10 = 3.36353e−09

23rd surface $\kappa = 0.000$
A4 = 4.97492e−04, A6 = −1.65694e−05, A8 = −9.73472e−07,
A10 = 5.71606e−09

Zoom data (∞)
Image height 3.84
Zoom ratio 4.8

| | WE | ST1 | ST2 | ST3 | TE |
|---|---|---|---|---|---|
| Focal length | 5.13 | 7.16 | 10.82 | 17.13 | 24.36 |
| Fno. | 3.99 | 4.63 | 5.31 | 4.78 | 5.99 |
| Angle of field 2ω | 75.37 | 56.42 | 37.18 | 24.10 | 17.37 |
| BF (in air) | 4.39 | 4.37 | 4.73 | 4.65 | 5.16 |
| Lens total length | 55.10 | 55.10 | 55.11 | 55.10 | 55.11 |
| d7 | 1.05 | 2.85 | 5.34 | 7.33 | 8.37 |
| d12 | 8.27 | 6.46 | 3.99 | 1.98 | 0.95 |
| d13 | 9.37 | 7.76 | 6.19 | 3.75 | 0.95 |

-continued

Unit mm

| | | | | | |
|---|---|---|---|---|---|
| d21 | 2.51 | 4.14 | 5.34 | 7.86 | 10.16 |
| d23 | 2.86 | 2.84 | 3.20 | 3.12 | 3.63 |

Unit focal length

| f1 = 14.15 | f2 = −8.69 | f3 = 10.82 | f4 = 19.70 |
|---|---|---|---|

Example 6

Unit mm

Surface data

| Surface no. | r | d | nd | vd |
|---|---|---|---|---|
| Object plane | ∞ | ∞ | | |
| 1 | −578.852 | 0.70 | 2.00069 | 25.46 |
| 2 | 12.873 | 2.62 | | |
| 3 | ∞ | 8.15 | 1.84666 | 23.78 |
| 4 | ∞ | 0.20 | | |
| 5* | 17.816 | 2.75 | 1.69350 | 53.21 |
| 6* | −12.743 | −0.50 | | |
| 7 | ∞ | Variable | | |
| 8* | −13.471 | 0.70 | 1.80610 | 40.92 |
| 9* | 15.029 | 0.61 | | |
| 10 | 132.686 | 1.72 | 1.92286 | 20.88 |
| 11 | −12.114 | 0.48 | 1.81600 | 46.62 |
| 12 | 28.087 | Variable | | |
| 13 | 11.844 | 1.00 | 1.69680 | 55.53 |
| 14 | 21.386 | 0.50 | | |
| 15(Stop) | ∞ | Variable | | |
| 16* | 5.915 | 3.66 | 1.49700 | 81.54 |
| 17* | −9.831 | 0.20 | | |
| 18 | −24.187 | 2.22 | 1.49700 | 81.54 |
| 19 | −10.189 | 0.50 | 1.72916 | 54.68 |
| 20 | 25.707 | 0.59 | | |
| 21 | 5.487 | 0.50 | 2.00069 | 25.46 |
| 22 | 3.287 | 1.96 | 1.58913 | 61.14 |
| 23 | 4.914 | Variable | | |
| 24* | 18.720 | 1.76 | 1.53071 | 55.60 |
| 25* | −91.975 | Variable | | |
| 26 | ∞ | 0.50 | 1.51633 | 64.14 |
| 27 | ∞ | 0.50 | | |
| 28 | ∞ | 0.50 | 1.51633 | 64.14 |
| 29 | ∞ | 0.37 | | |
| Image plane | ∞ | | | |

Aspherical surface data

5th surface $\kappa = 0.000$
A4 = −2.15033e−05, A6 = 1.17293e−07, A8 = −2.05025e−08,
A10 = −2.99503e−11

6th surface $\kappa = −0.037$
A4 = 1.30960e−04, A6 = −8.95756e−08, A8 = −1.17337e−08,
A10 = −7.14491e−11

8th surface $\kappa = 0.000$
A4 = 2.51129e−04, A6 = −3.06449e−06, A8 = 7.90321e−07,
A10 = −4.88303e−08

9th surface $\kappa = 0.000$
A4 = 7.76422e−05, A6 = 1.66824e−06, A8 = 1.26091e−06,
A10 = −1.10485e−07

-continued

Unit mm

16th surface

κ = 0.000
A4 = −3.72966e−04, A6 = −4.48827e−06, A8 = 6.71360e−08,
A10 = −5.79224e−09
17th surface κ = 0.000
A4 = 6.78705e−04, A6 = −2.56939e−06, A8 = 1.59712e−07
24th surface κ = 0.000
A4 = −1.41083e−04, A6 = 8.58495e−06, A8 = −4.74602e−06,
A10 = 2.04918e−07
25th surface κ = 0.000
A4 = −6.00940e−05, A6 = −1.81742e−05, A8 = −3.07230e−06,
A10 = 1.55909e−07

Zoom data (∞)
Image height 3.84
Zoom ratio 4.8

|  | WE | ST1 | ST2 | ST3 | TE |
|---|---|---|---|---|---|
| Focal length | 5.10 | 6.95 | 10.68 | 16.97 | 24.44 |
| Fno. | 4.00 | 4.44 | 5.31 | 4.65 | 5.98 |
| Angle of field 2ω | 75.58 | 57.69 | 37.90 | 24.36 | 17.37 |
| BF (in air) | 4.97 | 4.82 | 4.49 | 4.96 | 5.18 |
| Lens total length | 57.66 | 57.64 | 57.67 | 57.71 | 57.63 |
| d7 | 1.07 | 3.00 | 5.19 | 7.50 | 8.30 |
| d12 | 8.07 | 6.12 | 3.97 | 1.70 | 0.80 |
| d15 | 10.80 | 9.30 | 6.88 | 4.37 | 0.80 |
| d23 | 2.43 | 4.08 | 6.83 | 8.87 | 12.23 |
| d25 | 3.44 | 3.29 | 2.96 | 3.43 | 3.65 |

Unit focal length

| f1 = 14.45 | f2 = −7.58 | f3 = 36.52 | f4 = 13.88 | f5 = 29.47 |
|---|---|---|---|---|

Example 7

Unit mm

Surface data

| Surface no. | r | d | nd | vd |
|---|---|---|---|---|
| Object plane | ∞ | ∞ | | |
| 1 | 490.066 | 1.20 | 1.74330 | 49.33 |
| 2* | 6.604 | 1.85 | | |
| 3 | 11.103 | 2.63 | 1.90366 | 31.31 |
| 4 | 29.029 | Variable | | |
| 5 (Stop) | ∞ | 0.68 | | |
| 6* | 9.567 | 2.91 | 1.58313 | 59.46 |
| 7* | −19.577 | 0.50 | | |
| 8 | 8.957 | 0.70 | 1.72825 | 28.46 |
| 9 | 3.817 | 1.50 | 1.81600 | 46.62 |
| 10 | 4.917 | Variable | | |
| 11 | 16.687 | 1.65 | 1.58313 | 59.46 |
| 12* | −117.694 | Variable | | |
| 13 | ∞ | 0.86 | 1.54771 | 62.84 |
| 14 | ∞ | 0.50 | | |
| 15 | ∞ | 0.50 | 1.51633 | 64.14 |
| 16 | ∞ | 0.43 | | |
| Image plane | ∞ | | | |

-continued

Unit mm

Aspherical surface data

2nd surface

κ = −0.666
A4 = −2.15412e−05, A6 = 3.82323e−06, A8 = −1.33754e−07,
A10 = 1.57468e−09
6th surface κ = 0.000
A4 = −3.29456e−04, A6 = −6.21006e−06, A8 = −2.43365e−07,
A10 = −5.51107e−09
7th surface κ = 0.000
A4 = −1.03232e−04, A6 = −5.07309e−06, A8 = −2.79815e−07,
A10 = −6.90727e−10
12th surface κ = 0.000
A4 = 1.13575e−04, A6 = −4.19182e−06, A8 = 7.33370e−08

Zoom data (∞)
Image height 4.54
Zoom ratio 2.9

|  | WE | ST1 | ST2 | ST3 | TE |
|---|---|---|---|---|---|
| Focal length | 8.16 | 9.71 | 12.90 | 16.95 | 23.55 |
| Fno. | 2.85 | 3.08 | 3.49 | 4.12 | 5.12 |
| Angle of field 2ω | 60.53 | 51.24 | 38.95 | 29.75 | 21.44 |
| BF (in air) | 6.04 | 5.88 | 6.38 | 5.83 | 5.15 |
| Lens total length | 46.52 | 44.28 | 41.65 | 42.47 | 45.74 |
| d4 | 18.84 | 14.95 | 9.16 | 5.74 | 2.58 |
| d10 | 8.02 | 9.83 | 12.51 | 17.28 | 24.39 |
| d12 | 4.22 | 4.07 | 4.56 | 4.02 | 3.34 |

Unit focal length

| f1 = −19.63 | f2 = 14.66 | f3 = 25.18 |
|---|---|---|

Example 8

Unit mm

Surface data

| Surface no. | r | d | nd | vd |
|---|---|---|---|---|
| Object plane | ∞ | ∞ | | |
| 1 | 56.014 | 0.70 | 2.00069 | 25.46 |
| 2 | 10.323 | 2.53 | | |
| 3 | ∞ | 8.17 | 1.84666 | 23.78 |
| 4 | ∞ | 0.20 | | |
| 5* | 17.593 | 2.86 | 1.69300 | 53.14 |
| 6 | −12.945 | 0.20 | 1.63387 | 23.38 |
| 7* | −12.342 | −0.50 | | |
| 8 | ∞ | Variable | | |
| 9* | −16.538 | 0.70 | 1.74283 | 49.33 |
| 10* | 31.222 | 0.68 | | |
| 11 | −18.074 | 1.76 | 1.92286 | 20.88 |
| 12 | −7.087 | 0.50 | 1.88300 | 40.76 |
| 13 | ∞ | Variable | | |
| 14 (Stop) | ∞ | Variable | | |
| 15* | 6.770 | 3.08 | 1.49650 | 81.61 |
| 16* | −10.397 | 0.20 | | |

-continued

Unit mm

| | | | | |
|---|---|---|---|---|
| 17 | 16.766 | 3.02 | 1.49700 | 81.54 |
| 18 | −12.551 | 0.50 | 1.58144 | 40.75 |
| 19 | −20.808 | 0.59 | | |
| 20 | 68.059 | 0.50 | 1.90366 | 31.32 |
| 21 | 4.088 | 1.98 | 1.48749 | 70.23 |
| 22 | 5.116 | Variable | | |
| 23* | 22.406 | 2.14 | 1.53071 | 55.60 |
| 24* | −21.051 | 可変 | | |
| 25 | ∞ | 0.50 | 1.51633 | 64.14 |
| 26 | ∞ | 0.50 | | |
| 27 | ∞ | 0.50 | 1.51633 | 64.14 |
| 28 | ∞ | 0.37 | | |
| Image plane | ∞ | | | |

Aspherical surface data

5th surface

κ = 0.000
A4 = −2.25736e−05, A6 = −1.83853e−08, A8 = −4.73922e−08,
A10 = 7.35396e−10

7th surface

κ = 0.000
A4 = 1.40732e−04, A6 = −4.85505e−07, A8 = −2.88278e−08,
A10 = 5.65320e−10

9th surface

κ = 0.000
A4 = −8.59653e−05, A6 = −1.04321e−05, A8 = 1.03489e−06,
A10 = −6.16807e−08

10th surface

κ = 0.000
A4 = −2.80335e−04, A6 = 3.57374e−06, A8 = 3.53948e−08,
A10 = −8.01030e−08

15th surface

κ = 0.000
A4 = −6.53308e−04, A6 = 1.10245e−06, A8 = −1.73593e−07,
A10 = −4.28254e−09

16th surface

κ = 0.000
A4 = 4.67802e−04, A6 = 1.29702e−06, A8 = −1.75266e−07

23rd surface

κ = 0.000
A4 = 1.31599e−04, A6 = 1.81061e−0, A8 = −5.80528e−06,
A10 = 2.38071e−07

24th surface

κ = 0.000
A4 = 1.84757e−04, A6 = 4.33697e−06, A8 = −5.06910e−06,
A10 = 2.08712e−07

Zoom data (∞)
Image height 3.84
Zoom ratio 4.7

| | WE | ST1 | ST2 | ST3 | TE |
|---|---|---|---|---|---|
| Focal length | 5.14 | 7.00 | 10.71 | 16.98 | 24.38 |
| Fno. | 4.00 | 4.64 | 5.31 | 4.74 | 6.00 |
| Angle of field 2ω | 75.21 | 57.78 | 37.45 | 24.23 | 17.31 |
| BF (in air) | 4.46 | 4.28 | 4.68 | 4.53 | 5.11 |
| Lens total length | 54.93 | 54.93 | 54.93 | 54.92 | 54.93 |
| d8 | 1.05 | 2.59 | 5.18 | 7.12 | 8.18 |
| d13 | 8.07 | 6.53 | 3.94 | 2.00 | 0.95 |
| d14 | 9.18 | 7.67 | 6.15 | 3.75 | 0.95 |
| d22 | 2.35 | 4.04 | 5.16 | 7.71 | 9.93 |
| d24 | 2.93 | 2.75 | 3.15 | 3.00 | 3.58 |

Unit focal length

| f1 = 14.00 | f2 = −8.55 | f3 = 10.54 | f4 = 20.81 |
|---|---|---|---|

Example 9

Unit mm

Surface data

| Surface no. | r | d | nd | νd |
|---|---|---|---|---|
| Object plane | ∞ | ∞ | | |
| 1 | 56.014 | 0.70 | 2.00069 | 25.46 |
| 2 | 10.323 | 2.53 | | |
| 3 | ∞ | 8.17 | 1.84666 | 23.78 |
| 4 | ∞ | 0.20 | | |
| 5* | 17.542 | 2.63 | 1.69300 | 53.14 |
| 6* | −12.531 | −0.50 | | |
| 7 | ∞ | Variable | | |
| 8* | −16.351 | 0.70 | 1.74283 | 49.33 |
| 9* | 33.515 | 0.68 | | |
| 10 | −20.071 | 1.76 | 1.92286 | 20.88 |
| 11 | −7.259 | 0.50 | 1.88300 | 40.76 |
| 12 | 199.895 | Variable | | |
| 13 (Stop) | ∞ | Variable | | |
| 14 | 7.700 | 3.08 | 1.49650 | 81.61 |
| 15 | −27.933 | 0.20 | | |
| 16* | 7.345 | 3.02 | 1.53071 | 55.60 |
| 17 | −11.012 | 0.50 | 1.63387 | 23.38 |
| 18* | −15.402 | 0.59 | | |
| 19 | −278.085 | 0.50 | 1.90366 | 31.32 |
| 20 | 4.120 | 1.98 | 1.48749 | 70.23 |
| 21 | 5.127 | Variable | | |
| 22* | 20.731 | 2.14 | 1.53071 | 55.60 |
| 23* | −24.244 | Variable | | |
| 24 | ∞ | 0.50 | 1.51633 | 64.14 |
| 25 | ∞ | 0.50 | | |
| 26 | ∞ | 0.50 | 1.51633 | 64.14 |
| 27 | ∞ | 0.37 | | |
| Image plane | ∞ | | | |

Aspherical surface data

5th surface

κ = 0.000
A4 = −1.65625e−05, A6 = 1.30172e−08, A8 = −5.35337e−08,
A10 = 3.11741e−10

6th surface

κ = 0.000
A4 = 1.32054e−04, A6 = −4.27951e−07, A8 = −3.41025e−08,
A10 = 1.56271e−10

8th surface

κ = 0.000
A4 = −1.29445e−04, A6 = −7.10191e−06, A8 = 1.17172e−06,
A10 = −5.62911e−08

9th surface

κ = 0.000
A4 = −3.20686e−04, A6 = 3.28251e−06, A8 = 6.14341e−07,
A10 = −6.44199e−08

16th surface

κ = 0.000
A4 = −6.00887e−04, A6 = −2.21356e−05, A8 = −3.68538e−07,
A10 = −4.22280e−08

-continued

Unit mm

18th surface

κ = 0.000
A4 = 2.68063e−04, A6 = −3.23828e−05, A8 = −1.50099e−07,
A10 = 2.72610e−09
22nd surface κ = 0.000
A4 = −1.43533e−04, A6 = 1.54852e−05, A8 = −4.32164e−06,
A10 = 1.72972e−07
23rd surface κ = 0.000
A4 = −6.53028e−05, A6 = −2.30742e−06, A8 = −3.14689e−06,
A10 = 1.36412e−07

Zoom data (∞)
Image height 3.84
Zoom ratio 4.7

|  | WE | ST1 | ST2 | ST3 | TE |
|---|---|---|---|---|---|
| Focal length | 5.13 | 6.9 | 10.69 | 16.97 | 24.367 |
| Fno. | 3.99 | 4.63 | 5.25 | 4.72 | 5.97 |
| Angle of field 2ω | 75.28 | 58.27 | 37.53 | 24.22 | 17.25 |
| FB (in air) | 4.63 | 4.41 | 4.77 | 4.57 | 5.19 |
| Lens total length | 54.85 | 54.85 | 54.85 | 54.84 | 54.85 |

-continued

Unit mm

|  | | | | | |
|---|---|---|---|---|---|
| d7 | 1.05 | 2.58 | 5.31 | 7.19 | 8.23 |
| d12 | 8.13 | 6.60 | 3.87 | 1.99 | 0.95 |
| d13 | 9.29 | 7.76 | 6.34 | 3.81 | 0.95 |
| d21 | 2.37 | 4.12 | 5.17 | 7.91 | 10.15 |
| d23 | 3.10 | 2.88 | 3.24 | 3.04 | 3.66 |

Unit focal length

| f1 = 14.20 | f2 = −8.63 | f3 = 10.70 | f4 = 21.41 |

FIGS. 10A-10C, through 18A-18C are aberration diagrams of the zoom lenses according to the first to the ninth embodiments in the state in which the zoom lenses are focused on an object point at infinity. These aberration diagrams show spherical aberration (SA), astigmatism (AS), distortion (DT), and chromatic aberration of magnification (CC) respectively at the wide angle end (FIGS. 10A, 11A, 12A, 13A, 14A, 15A, 16A, 17A, and 18A), in the second intermediate focal length state (FIGS. 10B, 11B, 12B, 13B, 14B, 15B, 16B, 17B, and 18B), and at the telephoto end (FIGS. 10C, 11C, 12C, 13C, 14C, 15C, 16C, 17C, and 18C). In these diagrams, ω represents half the angle of view.

Further, values of conditional expressions (1)-(13), (A), (B), (C) of each of embodiments.

| Expressions | Example 1 | Example 2 | Example 3 | Example 4 | Example 5 |
|---|---|---|---|---|---|
| (1) $R_r/f_{IP1}$ | 0.450 | 0.479 | 0.460 | 0.512 | 0.508 |
| (2) $\nu_O - \nu_I$ | −35.68 | −35.68 | −38.91 | −35.68 | −38.91 |
| (3) $SF_{cem}$ | 3.523 | 3.273 | 1.911 | 3.638 | 1.448 |
| (4) $N_I$ | 1.58913 | 1.58913 | 1.48749 | 1.58913 | 1.48749 |
| (5) $\nu_I$ | 61.14 | 61.14 | 70.23 | 61.14 | 70.23 |
| (6) $N_O$ | 2.00069 | 2.00069 | 1.90366 | 2.00069 | 1.90366 |
| (7) $\nu_O$ | 25.46 | 25.46 | 31.32 | 25.46 | 31.32 |
| (8) $f_{cem}/f_{IP1}$ | −0.986 | −0.897 | −0.636 | −1.018 | −0.554 |
| (9) $f_{FP}/f_T$ | 0.548 | 0.571 | 0.572 | 0.500 | 0.578 |
| (10) $f_{FN}/f_T$ | −0.336 | −0.351 | −0.352 | −0.291 | −0.355 |
| (11) $f_{IP1}/f_T$ | 0.424 | 0.439 | 0.439 | 0.377 | 0.441 |
| (12) $f_{IP2}/f_T$ | 0.939 | 0.859 | 0.891 | 1.230 | 0.805 |
| (13) $L_T/f_T$ | 2.209 | 2.253 | 2.250 | 2.110 | 2.266 |
| (A) $\beta_{IP1T}/\beta_{IP1W}$ | 2.140 | 2.155 | 2.168 | 2.139 | 2.151 |
| (B) $(\beta_{IP1T}/\beta_{IP1W})/(f_T/f_W)$ | 0.449 | 0.452 | 0.453 | 0.453 | 0.449 |
| (C) $SF_{air}$ | 0.833 | 1.643 | 0.202 | 2.053 | 1.498 |

| Expressions | Example 6 | Example 7 | Example 8 | Example 9 |
|---|---|---|---|---|
| (1) $R_r/f_{IP1}$ | 0.380 | 0.335 | 0.486 | 0.479 |
| (2) $\nu_O - \nu_I$ | −35.68 | −18.16 | −38.91 | −38.91 |
| (3) $SF_{cem}$ | 13.637 | 3.433 | 1.128 | 0.964 |
| (4) $N_I$ | 1.58913 | 1.816 | 1.48749 | 1.48749 |
| (5) $\nu_I$ | 61.14 | 46.62 | 70.23 | 70.23 |
| (6) $N_O$ | 2.00069 | 1.72825 | 1.90366 | 1.90366 |
| (7) $\nu_O$ | 25.46 | 28.46 | 31.32 | 31.32 |
| (8) $f_{cem}/f_{IP1}$ | −1.617 | −0.195 | −0.488 | −0.439 |
| (9) $f_{FP}/f_T$ | 0.587 | — | 0.574 | 0.583 |
| (10) $f_{FN}/f_T$ | −0.340 | — | −0.351 | −0.354 |
| (11) $f_{IP1}/f_T$ | 0.532 | — | 0.432 | 0.439 |
| (12) $f_{IP2}/f_T$ | 1.000 | — | 0.853 | 0.879 |
| (13) $L_T/f_T$ | 2.364 | 1.964 | 2.267 | 2.265 |
| (A) $\beta_{IP1T}/\beta_{IP1W}$ | 2.749 | 2.754 | 2.156 | 2.153 |
| (B) $(\beta_{IP1T}/\beta_{IP1W})/(f_T/f_W)$ | 0.572 | 0.955 | 0.455 | 0.454 |
| (C) $SF_{air}$ | 2.119 | 0.372 | −0.532 | −1.117 |

(Correction of Distortion)

Incidentally, when the zoom lens system of the present invention is used, a digital correction of distortion of an image is carried out electrically. A basic concept for the digital correction of the distortion of an image will be described below.

Figure 19:
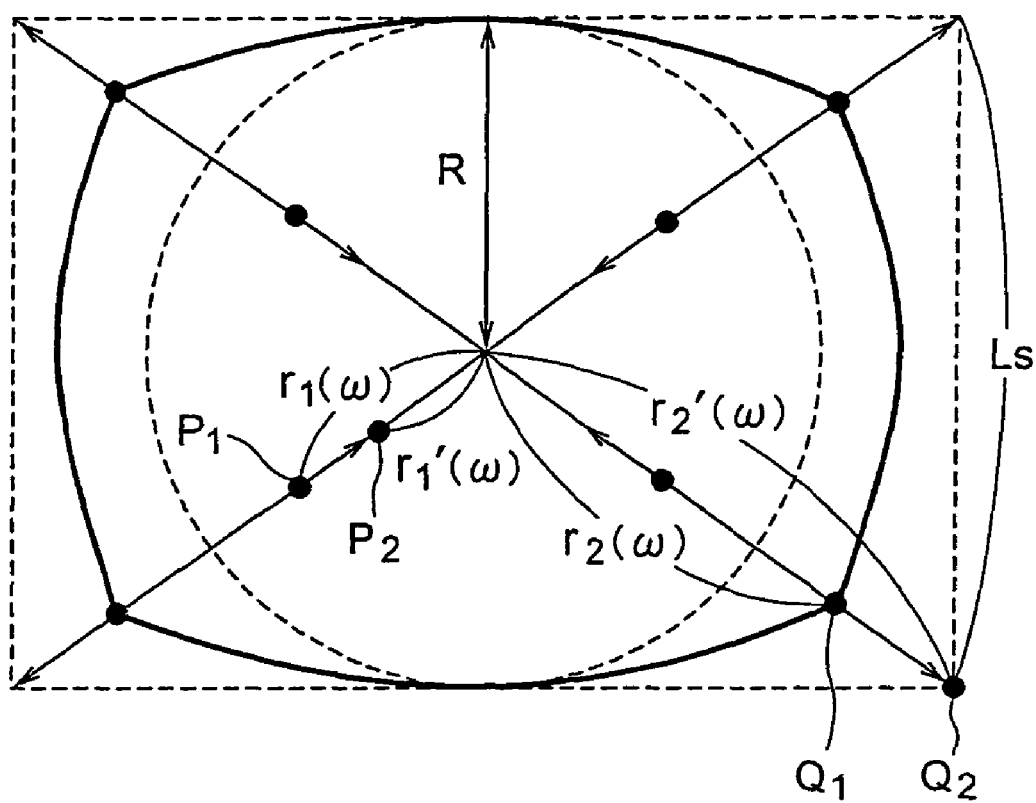
FIG. 19 is a diagram illustrating correction of distortion.

For example, as shown in FIG. 19, with a point of intersection of an optical axis and an image pickup plane to be a center, a magnification on a circumference (image height) of a circle of radius R making a contact internally with a longer side of an effective image pickup plane is fixed, and this circumference is let to be a base reference for the correction. Next, each point on a circumference (image height) of an arbitrary radius r(ω) other than the radius R is moved in a substantial direction of radiation, and the correction is carried out by moving on a concentric circle such that the radius becomes r'(ω).

For example, in FIG. 19, a point $P_1$ on a circumference of an arbitrary radius $r_1(ω)$ positioned at an inner side of a circle of radius R is moved to a point $P_2$ on a circumference of a radius $r_1'(ω)$ which is to be corrected, directed toward a center of the circle. Moreover, a point $Q_1$ on a circumference of an arbitrary radius $r_2(ω)$ positioned at an outer side of the circle of radius R is moved to a point $Q_2$ on a circumference of a radius $r_2'(ω)$ which is to be corrected, directed toward a direction away from the center of the circle.

Here, r'(ω) can be expressed as follows.

$$r'(ω)=α·f·\tan ω (0≤α≤1)$$

where, ω is a half angle of field of an object and f is a focal length of an imaging optical system (the zoom lens system in the present invention).

Here, when an ideal image height corresponding to a circle (image height) of radius R is let to be Y, then $$α=R/Y=R/(f·\tan ω).$$

The optical system, ideally, is rotationally symmetric with respect to an optical axis. In other words, the distortion also occurs in a rotationally symmetric manner with respect to the optical axis. Consequently, as it has been described above, in a case of correcting electrically the optical distortion, when it is possible to carry out correction by fixing a magnification on a circumference (image height) of the circle of radius R making a contact internally with a longer side of the effective image pickup plane, with a point of intersection of an optical axis on a reproduced image, and an image pickup plane to be a center, and moving each point on the circumference (image height) of radius r(ω) other than the radius R in a substantial direction of radiation, and moving on a concentric circle such that the radius becomes r'(ω), it can be considered to be advantageous from a point of amount of data and amount of calculation.

Incidentally, an optical image ceases to be a continuous amount at a point of time when an image is picked up by an electronic image pickup element (due to sampling). Consequently, the circle of radius R which is drawn exactly on the optical image ceases to be an accurate circle as long as pixels on the electronic image pickup element are not arranged radially.

In other words, regarding a shape correction of image data expressed for each discrete coordinate point, a circle which can fix the magnification does not exist. Therefore, for each pixel (Xi, Yj), a method of determining coordinates of a destination of movement (Xi', Yj') may be used. When two or more points (Xi, Yj) have moved to the coordinates (Xi', Yj'), an average of values of each pixel is taken. Moreover, when there is no point which has moved, interpolation may be performed by using a value of coordinate (Xi', Yj') of some of the surrounding pixels.

Such method is effective for correction when the distortion with respect to the optical axis is remarkable due to a manufacturing error etc. of the optical system or the electronic image pickup element, in the electronic image pickup apparatus having the zoom lens system in particular, and when the circle of the radius R drawn on the optical image is asymmetric. Moreover, it is effective for correction when there occurs to be a geometric distortion at the time of reproducing a signal to an image in an image pickup element or various output devices.

In the electronic image pickup apparatus of the present invention, for calculating a correction amount r'(ω)−r(ω), an arrangement may be made such that a relationship between r(ω), in other words, half angle of field and the image height, or a relationship between a real image height r and an ideal image height r'/α is recorded in a recording medium which is built-in in the electronic image pickup apparatus.

For an image after the distortion correction, not to have an extreme shortage of an amount of light at both ends in a direction of short side, the radius R may satisfy the following conditional expression.

$$0≤R≤0.6Ls$$

where, Ls is a length of a short side of the effective image pickup surface.

It is preferable that the radius R satisfies the following conditional expression.

$$0.3Ls≤R≤0.6Ls$$

Furthermore, it is most advantageous to match the radius R with a radius of a circle making an internal contact in a short side direction of a substantially effective image pickup plane. In a case of correction in which, the magnification is fixed near the radius R=0, in other words, near on the axis, it is somewhat disadvantageous from an aspect of substantial number of images, but it is possible to secure an effect for making the size small even when the angle is widened.

A focal length interval which requires a correction is divided into a number of focal point zones. Moreover, the correction may be carried out with the amount of correction as in a case in which, a correction result which satisfies substantially the following relationship $$r'(ω)=α·f·\tan ω$$

near a telephoto end in the focal point zones which are divided.

However, in this case, at a wide angle end in the focal point zones which are divided, a barrel-shape distortion at the wide angel end of the focal point zones which are divided is remained to some extent. Moreover, when the number of divided zones is increased, there arises a need to hold specific data necessary for correction, additionally in a recording medium. Therefore it is not preferable to increase the number of divided zones. Therefore, one or a plurality of coefficients associated with each focal length in the focal point zones which are divided, are calculated in advance. The coefficients may be determined based on a measurement by simulation or by actual equipment.

An amount of correction in a case in which, the correction result which satisfies substantially the following relationship $$r'(ω)=α·f·\tan ω$$

near the telephoto end in the focal point zones which are divided may be calculated, and may let to be a final amount of correction by multiplying uniformly the coefficient for each focal length with respect to this amount of correction.

Incidentally, when there is no distortion in an image achieved by imaging (forming an image) of an infinite object, the following relationship $$f = y/\tan \omega$$

holds.

Here, y denotes a height (image height) of an image point from the optical axis, f denotes a focal length of an imaging system (zoom lens system in the present invention), and ω denotes an angle (object half angle of field) with respect to the optical axis in an object point direction corresponding to image points connecting from a center on an image pickup plane up to a position of y.

When there is a barrel-shape distortion in the imaging system, the relationship becomes $$f > y/\tan \omega.$$

In other words, when the focal length f of the imaging system, and the image height y are let to be fixed, a value of ω becomes large.

(Digital Camera with Bended Optical Path)

The present invention can be applied to an electronic image pickup apparatus, in particular a digital camera or a video camera, in which an image of an object is formed by the zoom lens according to the present invention described in the foregoing, and the image is received and picked up by an electronic image pickup element such as a CCD. Such an embodiment will be described in the following.

(Digital Camera)

Further, the present invention could be applied to an electrical image pickup apparatus, especially a digital camera, video camera etc. in which the object image is formed by the above-mentioned zoom lens, then the object image is light-received such as CCD etc. Such embodiment will be described below.

Figure 20:
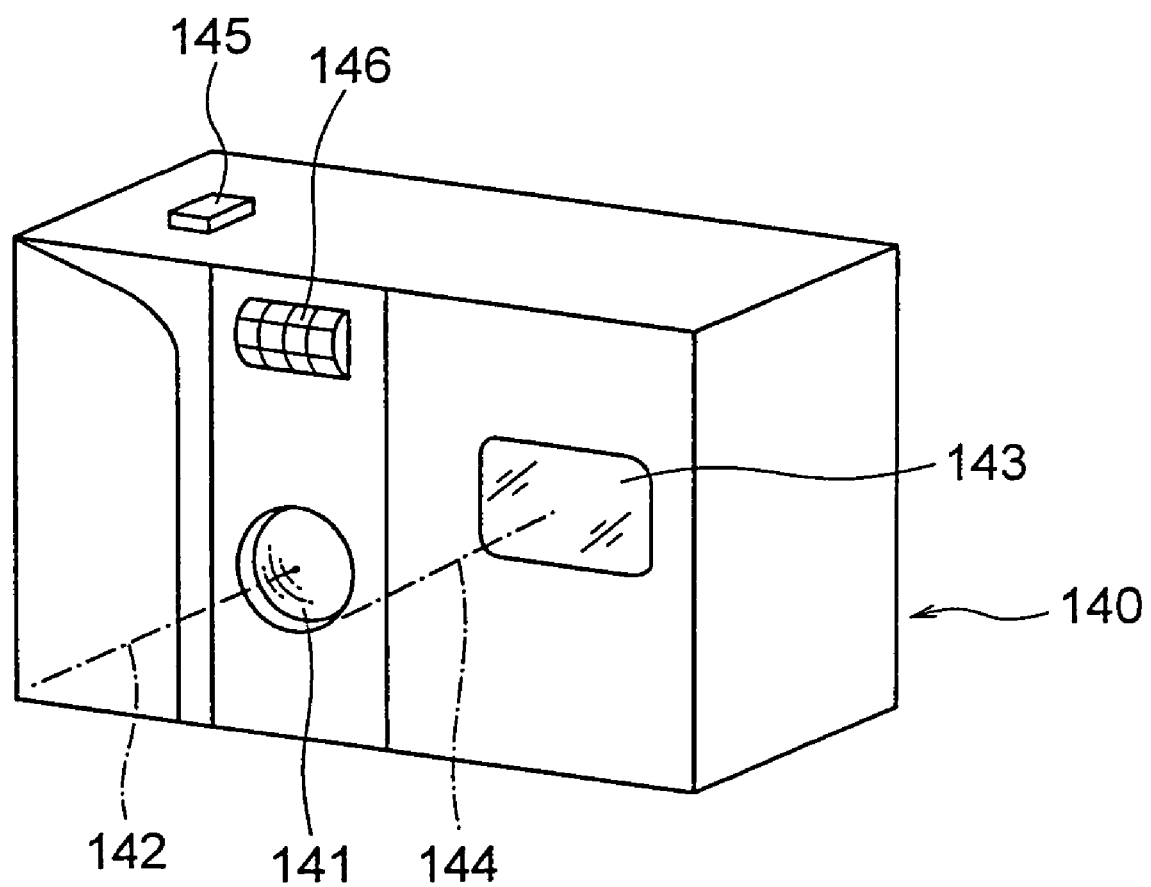
FIG. 20 is a front perspective view showing an outer appearance of a digital camera equipped with a zoom lens having a bent optical path according to the present invention.
Figure 21:
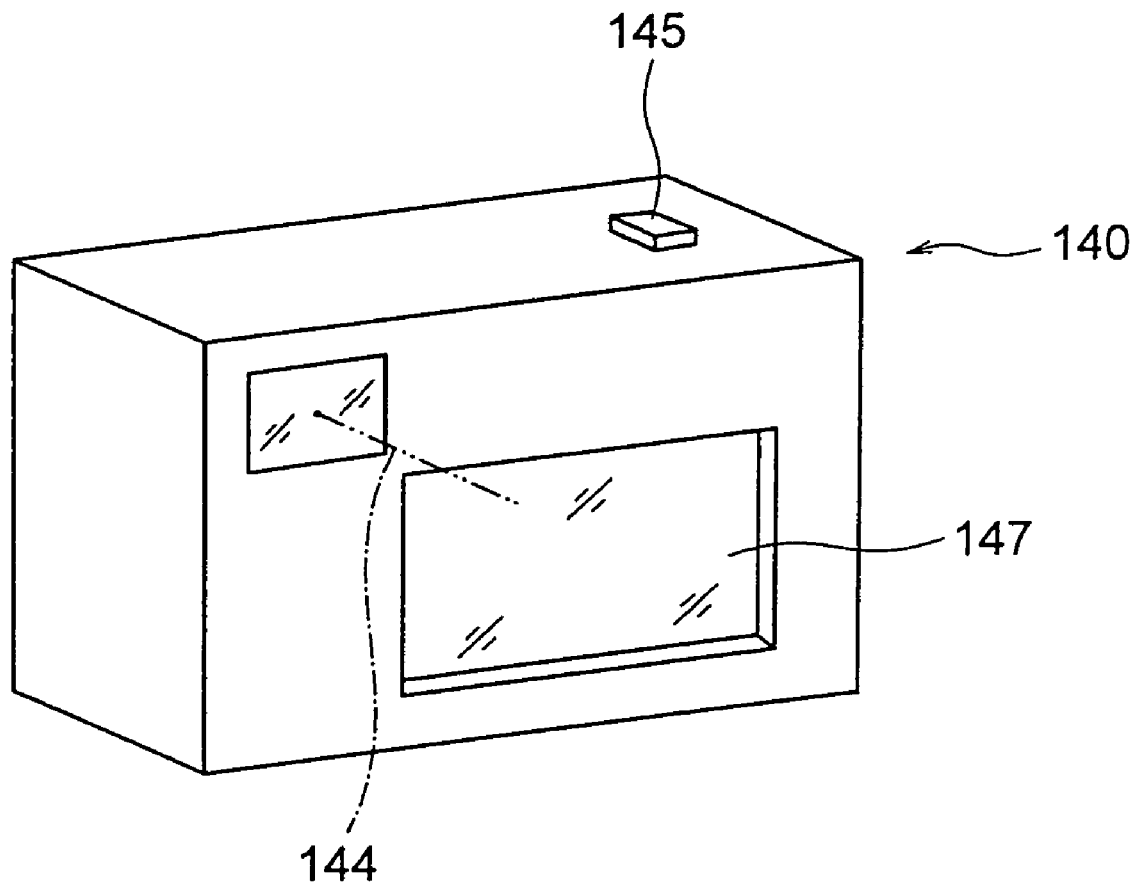
FIG. 21 is a rear perspective view of the digital camera.
Figure 22:
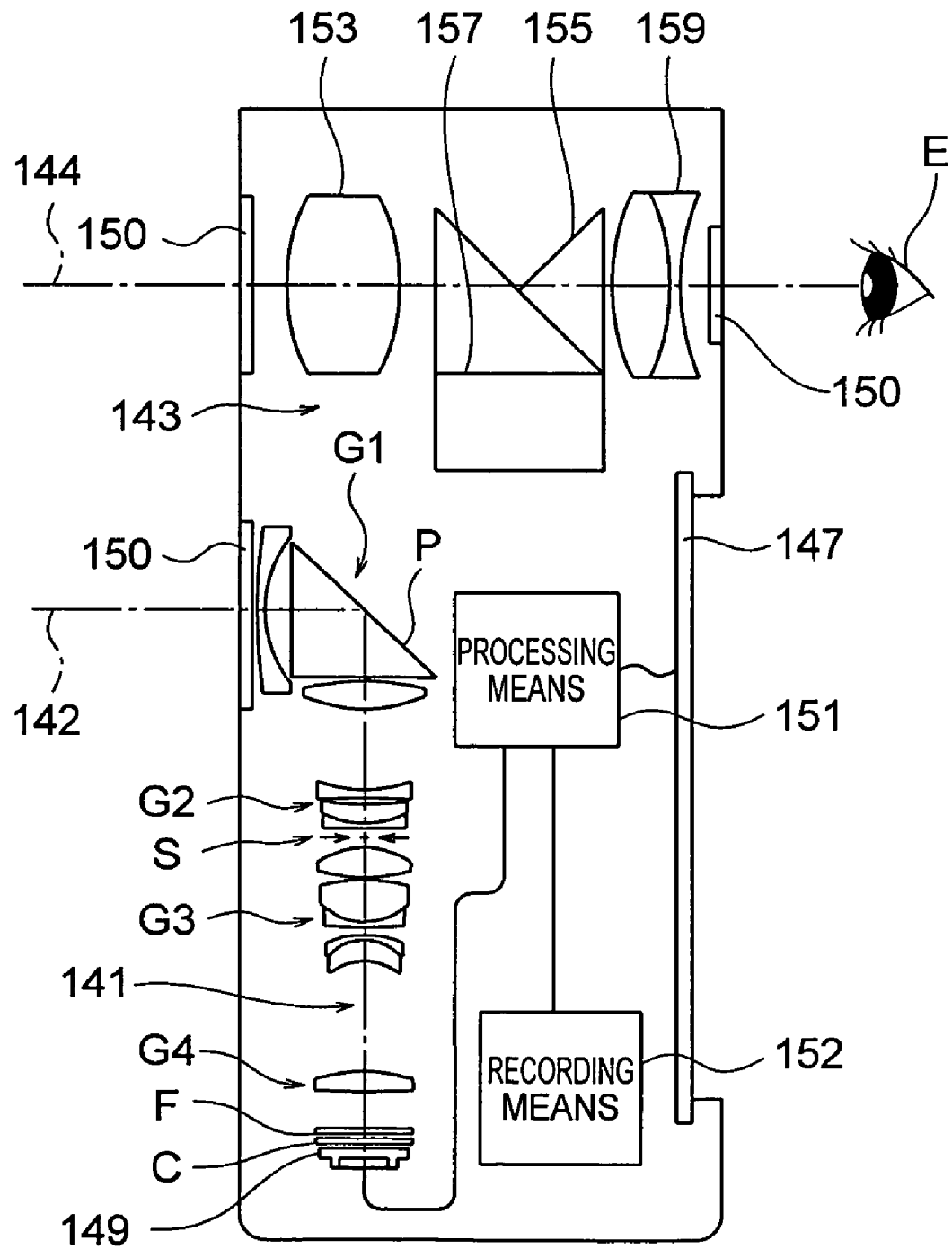
FIG. 22 is a cross sectional view of the digital camera.

FIG. 20 to FIG. 22 are conceptual diagrams of a structure of a digital camera according to the present invention in which a zoom lens system described above is incorporated in a taking optical system 141. FIG. 20 is a front perspective view showing an appearance of a digital camera 140, FIG. 21 is a rear perspective view of the same, and FIG. 22 is a schematic cross-sectional view showing a structure of the digital camera 140. The digital camera 140, in a case of this example, includes the taking optical system 141 having a taking optical path 142, a finder optical system 143 having a finder optical path 144, a shutter button 145, a flash 146, a liquid-crystal display monitor 147, a focal-length changing button 161, and a setting changing switch 162 etc., when the shutter button 145 disposed on an upper portion of the digital camera 140 is pressed, in synchronization with the pressing of the shutter button 145, a photograph is taken by the taking optical system 141 such as the optical path reflecting zoom lens system in the first embodiment. An object image formed by the taking optical system 141 is formed on an image pickup surface of a CCD 149 via a cover glass C and a low pass filter on which a wavelength region restricting coating is applied. An object image which is received as light by the CCD 149 is displayed on the liquid-crystal display monitor 147 which is provided on a rear surface of the digital camera 140 as an electronic image, via a processing means 151. Moreover, a recording means 152 is connected to the processing means 151, and it is also possible to record the electronic image which is taken. The recording means 152 may be provided separately from the processing means 151, or may be formed by recording by writing electronically in a flexible disc, a memory card, or an MO etc. Moreover, the camera may be formed as a silver-salt camera in which a silver-salt film is disposed instead of the CCD 149.

Furthermore, a finder objective optical system 153 is disposed on the finder optical path 144. An object image formed by the finder objective optical system 153 is formed on a field frame 157 of a Porro prism 155 which is an image erecting member. On a rear side of the Porro prism 155, an eyepiece optical system 159 which guides an erected image to a viewer's eyeball, is disposed. A cover member 150 is disposed on an emergence side of the eyepiece optical system 159.

Since the digital camera 140 structured in such manner has the taking optical system 141 according to the present invention, has a high zoom ratio of 5 magnifications. Since the zoom lens has a high optical performance, it is possible to realize the inexpensive digital camera in which the depth Although in the arrangement shown in FIG. 22 a plane parallel plate is provided as a cover member 150, it may be eliminated.

(Internal Circuit Structure)

Figure 23:
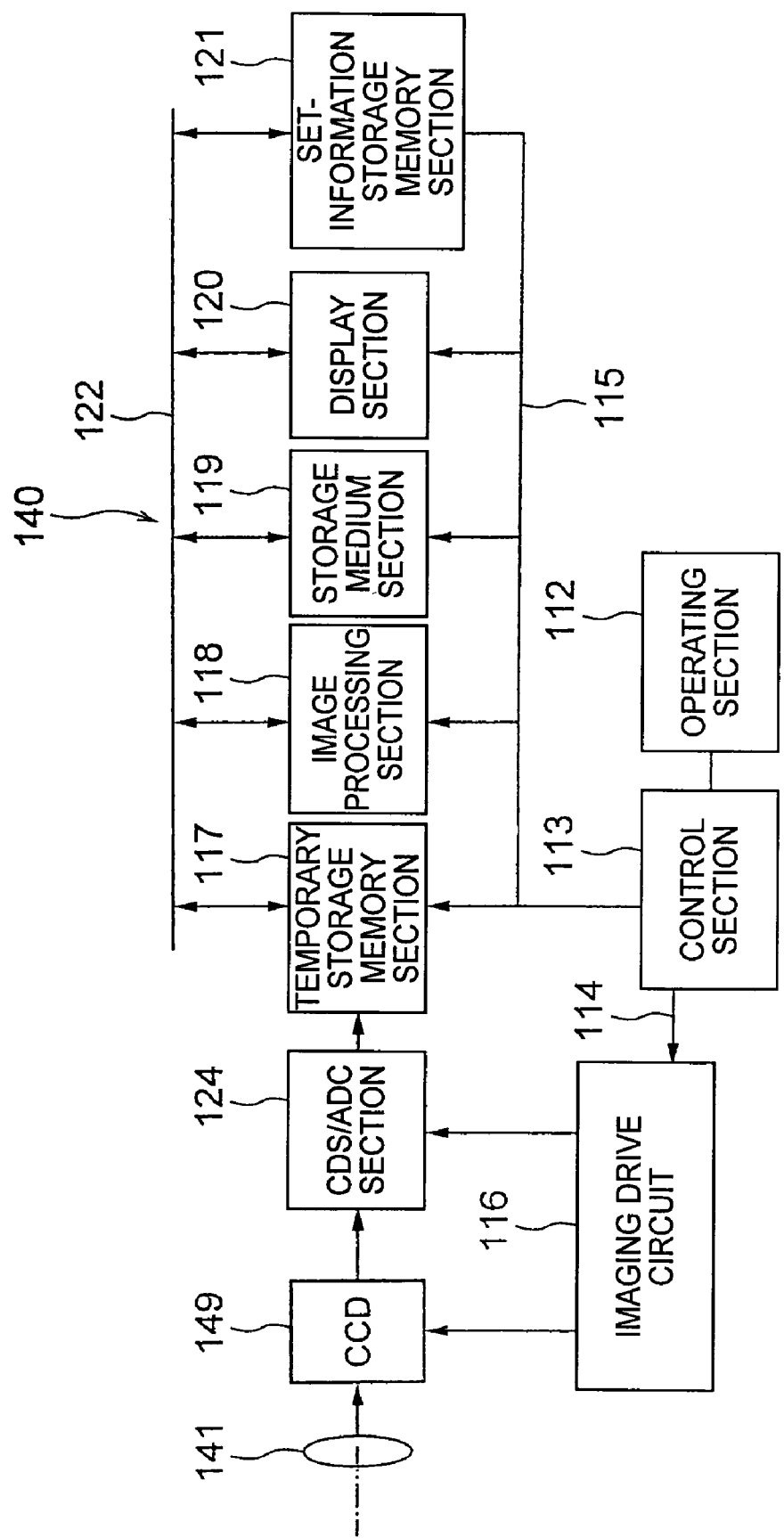
FIG. 23 is a block diagram showing the internal circuit configuration of a relevant portion of the digital camera.

FIG. 23 is a structural block diagram of an internal circuit of main components of the digital camera 140. In the following description, the processing means 151 described above includes for instance, a CDS/ADC section 124, a temporary storage memory 117, and an image processing section 118, and a storage means 152 consists of a storage medium section 119 for example.

As shown in FIG. 23, the digital camera 140 includes an operating section 112, a control section 113 which is connected to the operating section 112, the temporary storage memory 117 and an imaging drive circuit 116 which are connected to a control-signal output port of the control section 113, via a bus 114 and a bus 115, the image processing section 118, the storage medium section 119, a display section 120, and a set-information storage memory section 121.

The temporary storage memory 117, the image processing section 118, the storage medium section 119, the display section 120, and the set-information storage memory section 121 are structured to be capable of mutually inputting and outputting data via a bus 122. Moreover, the CCD 149 and the CDS/ADC section 124 are connected to the imaging drive circuit 116.

The operating section 112 includes various input buttons and switches, and is a circuit which informs the control section, event information which is input from outside (by a user of the digital camera) via these input buttons and switches.

The control section 113 is a central processing unit (CPU), and has a built-in computer program memory which is not shown in the diagram. The control section 113 is a circuit which controls the entire digital camera 140 upon receiving instructions and commands input by the user of the camera via the operating section 112, according to a computer program stored in this computer program memory.

The CCD 149 receives as light an object image which is formed via the taking optical system 141 according to the present invention. The CCD 149 is an image pickup element which is driven and controlled by the imaging drive circuit 116, and which converts an amount of light for each pixel of the object image to an electric signal, and outputs to the CDS/ADC section 124.

The CDS/ADC section 124 is a circuit which amplifies the electric signal which is input from the CCD 149, and carries out analog/digital conversion, and outputs to the temporary storage memory 117 image raw data (bare data, hereinafter called as 'RAW data') which is only amplified and converted to digital data.

The temporary storage memory 117 is a buffer which includes an SDRAM (Synchronous Dynamic Random Access Memory) for example, and is a memory device which stores temporarily the RAW data which is output from the CDS/ADC section 124. The image processing section 118 is a circuit which reads the RAW data stored in the temporary storage memory 117, or the RAW data stored in the storage medium section 119, and carries out electrically various image-processing including the distortion correction, based on image-quality parameters specified by the control section 113.

The storage medium section 119 is a recording medium in the form of a card or a stick including a flash memory for instance, detachably mounted. The storage medium section 119 is a control circuit of a device in which, the RAW data transferred from the temporary storage memory 117 and image data subjected to image processing in the image processing section 118 are recorded and maintained in the card flash memory and the stick flash memory.

The display section 120 includes the liquid-crystal display monitor, and is a circuit which displays images and operation menu on the liquid-crystal display monitor. The set-information storage memory section 121 includes a ROM section in which various image quality parameters are stored in advance, and a RAM section which stores image quality parameters which are selected by an input operation on the operating section 112, from among the image quality parameters which are read from the ROM section. The set-information storage memory section 121 is a circuit which controls an input to and an output from the memories.

The digital camera 140 structured in such manner has the taking optical system 141, according to the present invention, which, while having a sufficient wide angle region, and a compact structure, has an extremely stable imaging performance in the entire magnification region at a high magnification. Therefore, it is possible to realize the high performance, the small size, and widening of the angle. Moreover, a prompt focusing operation at the wide angle side and the telephoto side is possible.

The present invention can usefully be applied to zoom lenses in which variations of aberrations such as chromatic aberration of magnification can easily be made small while being small in size and having an adequate zoom ratio.

The present invention can provide a zoom lens in which variations of chromatic aberration of magnification can easily be made small while being small in size and having an adequate zoom ratio.

The present invention can also provide a zoom lens that does not take start-up time (for extending the lens) to bring the camera into a usable state unlike with a collapsible lens, is advantageous in achieving waterproofing and dustproofing, and can easily be designed to bend the optical path of the zoom lens to achieve an image pickup apparatus having a very small width.

Furthermore, the present invention can provide an image pickup apparatus equipped with such a zoom lens.

What is claimed is:

1. A zoom lens comprising a plurality of lens units and performs zooming from the wide angle end to the telephoto end by changing distances between the plurality of lens units, wherein the zoom lens comprises, in order from the object side to the image side, an object side lens group having a negative refracting power at the wide angle end and including at least one negative lens unit having a negative refracting power, and an image side lens group having a positive refracting power at the wide angle end and including at least one positive lens unit having a positive refracting power, wherein the distance between the object side lens group and the image side lens group is smaller at the telephoto end than at the wide angle end, the at least one positive lens unit having a positive refracting power in the image side lens group comprises a cemented doublet lens component, the cemented doublet lens component comprises, in order from the object side to the image side, an object side lens, which is a negative lens having a concave surface facing the image side, and an image side lens, which is a positive meniscus lens having a concave surface facing the image side, the cemented doublet lens component is located closest to the image side in the positive lens unit, and the zoom lens satisfies the following conditions:

$$0.20 < R_f/f_{IP1} < 1.40 \tag{1},$$

and $$0.5 < SF_{cem} < 20.0 \tag{3},$$

where $SF_{cem} = (R_f + R_r)/(R_f - R_r)$, $R_f$ is the radius of curvature of the object side surface of the object side lens in the cemented doublet lens component, $R_r$ is the radius of curvature of the image side surface of the image side lens in the cemented doublet lens component, and $f_{IP1}$ is the focal length of the positive lens unit including the cemented doublet lens component.

2. The zoom lens according to claim 1, wherein the refracting power of the object side lens group is always negative during zooming from the wide angle end to the telephoto end, and the refracting power of the image side lens group is always positive during zooming from the wide angle end to the telephoto end.

3. The zoom lens according to claim 1, wherein the positive lens unit including the cemented doublet lens component satisfies the following conditions during zooming from the wide angle end to the telephoto end:

$$1.3 < \beta_{IP1T}/\beta_{IP1W} < 40.0 \tag{A},$$

and $$0.30 < (\beta_{IP1T}/\beta_{IP1W})/(f_T/f_W) < 1.50 \tag{B},$$

where $\beta_{IP1T}$ is the magnification of the positive lens unit including the cemented doublet lens component at the telephoto end, $\beta_{IP1W}$ is the magnification of the positive lens unit including the cemented doublet lens component at the wide angle end, $f_T$ is the focal length of the entire zoom lens system at the telephoto end, and $f_W$ is the focal length of the entire zoom lens system at the wide angle end.

4. The zoom lens according to claim 1, wherein the cemented doublet lens satisfies the following condition:

$$-60 < \nu_O - \nu_I < -15 \tag{2},$$

where $\nu_O$ is the Abbe constant of the object side lens in the cemented doublet lens component, and $\nu_1$ is the Abbe constant of the image side lens in the cemented doublet lens component.

5. The zoom lens according to claim 1, wherein the cemented doublet lens component has a meniscus shape that satisfies the following condition:

$$1.05 < SF_{cem} < 20.0 \tag{3'}.$$

6. The zoom lens according to claim 1, wherein the image side lens in the cemented doublet lens component satisfies the following conditions:

$$1.43 < N_I < 1.82 \quad (4),$$

and $$45.0 < v_I < 95.0 \quad (5),$$

where $N_I$ is the refractive index of the image side lens in the cemented doublet lens component for the d-line, and $v_I$ is the Abbe constant of the image side lens in the double cemented lens component.

7. The zoom lens according to claim 1, wherein the object side lens in the cemented doublet lens satisfies the following conditions:

$$1.70 < N_O < 2.25 \quad (6),$$

and $$15.0 < v_O < 45.0 \quad (7),$$

where $N_O$ is the refractive index of the object side lens in the cemented doublet lens component for the d-line, and $v_O$ is the Abbe constant of the object side lens in the cemented doublet lens component.

8. The zoom lens according to claim 1, wherein the positive lens unit including the cemented doublet lens component comprises at least one positive lens component disposed on the object side of the cemented doublet lens component, where the term "lens component" refers to a lens block whose refractive surfaces that are in contact with air in an effective optical path comprise only two surfaces or an object side surface and an image side surface.

9. The zoom lens according to claim 1, wherein the positive lens unit including the cemented doublet lens component comprises a plurality of positive lens components disposed on the object side of the cemented doublet lens component, where the term "lens component" refers to a lens block whose refractive surfaces that are in contact with air in an effective optical path comprise only two surfaces or an object side surface and an image side surface.

10. The zoom lens according to claim 1, wherein the positive lens unit including the cemented doublet lens component comprises, in order from the object side to the image side, a single lens component having a positive refracting power, a cemented lens component having a positive refracting power and having a positive lens and a negative lens arranged in order from the object side, and the cemented doublet lens component.

11. The zoom lens according to claim 8, wherein the cemented doublet lens component has a negative refracting power that satisfies the following condition:

$$-5.00 < f_{cem}/f_{IP1} < -0.10 \quad (8),$$

where $f_{cem}$ is the focal length of the cemented doublet lens component.

12. The zoom lens according to claim 8, wherein the distance between the object side surface of the cemented doublet lens component and the image side surface of the lens disposed immediately on the object side of the cemented doublet lens is larger in a peripheral region than on the optical axis, and the following condition is satisfied:

$$-3.0 < SF_{air} < 20.0 \quad (c)$$

where $SF_{air} = (R_{fr} + R_f)/(R_{fr} - R_f)$, and $R_{fr}$ is the radius of curvature of the image side surface of the lens disposed immediately on the object side of the cemented doublet lens component.

13. The zoom lens according to claim 1, wherein the object side lens group comprises a positive lens unit having a positive refracting power that is disposed closer to the object side than the at least one negative lens unit having a negative refracting power in the object side lens group.

14. The zoom lens according to claim 13, wherein the positive lens unit in the object side lens group satisfies the following condition:

$$0.20 < f_{FP}/f_T < 1.20 \quad (9),$$

where $f_{FP}$ is the focal length of the positive lens unit in the object side lens group, and $f_T$ is the focal length of the entire zoom lens system at the telephoto end.

15. The zoom lens according to claim 13, wherein the at least one negative lens unit having a negative refracting power in the object side lens group satisfies the following condition:

$$-0.8 < f_{FN}/f_T < -0.10 \quad (10),$$

where $f_{FN}$ is the focal length of the negative lens unit in the object side lens group, and $f_T$ is the focal length of the entire zoom lens system at the telephoto end.

16. The zoom lens according to claim 13, wherein the distance between the positive lens unit and the at least one negative lens unit having a negative refracting power in the object side lens group is larger at the telephoto end than at the wide angle end, and the negative lens unit moves during zooming from the wide angle end to the telephoto end.

17. The zoom lens according to claim 13, wherein the positive lens unit in the object side lens group is the lens unit located closest to the object side in the zoom lens, and the position of this positive lens unit is fixed during zooming from the wide angle end to the telephoto end.

18. The zoom lens according to claim 17, wherein the positive lens unit in the object side lens group has a reflecting surface that bends the optical axis.

19. The zoom lens according to claim 1, wherein the image side lens group comprises a second positive lens unit having a positive refracting power that is disposed closer to the image side than the positive lens unit including the cemented doublet lens component.

20. The zoom lens according to claim 19, wherein the positive lens unit including the cemented doublet lens component in the image side lens group satisfies the following condition:

$$0.15 < f_{IP1}/F_T < 1.00 \quad (11),$$

where $f_T$ is the focal length of the entire zoom lens system at the telephoto end.

21. The zoom lens according to claim 19, wherein the second positive lens unit in the image side lens group satisfies the following condition:

$$0.40 < f_{IP2}/f_T < 2.50 \quad (12),$$

where $f_{IP2}$ is the focal length of the second positive lens unit, and $f_T$ is the focal length of the entire zoom lens system at the telephoto end.

22. The zoom lens according to claim 19, wherein the distance between the positive lens unit including the cemented doublet lens component and the second positive lens unit in the image side lens group is larger at the telephoto end than at the wide angle end, and the positive lens unit including the cemented doublet lens component moves during zooming from the wide angle end to the telephoto end.

23. The zoom lens according to claim 1, wherein the zoom lens satisfies the following condition:

$$1.20 < L_T/f_T < 4.00 \qquad (13),$$

where $L_T$ is the overall length of the zoom lens at the telephoto end, and $f_T$ is the focal length of the entire zoom lens system at the telephoto end.

24. The zoom lens according to claim 1, further comprising an aperture stop provided between the object side lens group and the image side lens group.

25. The zoom lens according to claim 24, wherein the position of the aperture stop is fixed during zooming from the wide angle end to the telephoto end.

26. The zoom lens according to claim 1, wherein the object side lens group comprises, in order from the object side to the image side, a positive lens unit having a positive refracting power and the negative lens unit, the image side lens group comprises two positive lens units each having a positive refracting power, and one of the two positive lens units each having a positive refracting power is the positive lens unit including the cemented doublet lens component.

27. The zoom lens according to claim 1, wherein the object side lens group comprises, in order from the object side to the image side, a positive lens unit having a positive refracting power and the negative lens unit, the image side lens group comprises three positive lens units each having a positive refracting power, and one of the three positive lens units each having a positive refracting power is the positive lens unit including the cemented doublet lens component.

28. The zoom lens according to claim 1, wherein the object side lens group consists of the negative lens unit, the image side lens group comprises two positive lens units each having a positive refracting power, and one of the two positive lens units each having a positive refracting power is the positive lens unit including the cemented doublet lens component.

29. An image pickup apparatus comprising:
   a zoom lens comprising a plurality of lens units and performing zooming from the wide angle end to the telephoto end by changing distances between the plurality of lens units; and
   an image pickup element comprising an image pickup surface disposed on the image side of the zoom lens and converting an image formed on the image pickup surface by the zoom lens into an electrical signal,
   wherein the zoom lens is a zoom lens according to claim 1.

30. The image pickup apparatus according to claim 29, further comprising an image transformation section that changes, by image processing, the electrical signal containing distortion attributed to the zoom lens into an image signal that is corrected in terms of distortion.

* * * * *